(12) United States Patent
Dou et al.

(10) Patent No.: US 10,764,805 B2
(45) Date of Patent: Sep. 1, 2020

(54) SIGNAL STRENGTH MEASUREMENT METHOD AND DEVICE

(71) Applicant: HUAWEI TECHNOLOGIES CO., LTD., Shenzhen, Guangdong (CN)

(72) Inventors: Fenghui Dou, Beijing (CN); Hui Jin, Beijing (CN); Guowei Ouyang, Beijing (CN); Qiang Yi, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 6 days.

(21) Appl. No.: 15/774,194

(22) PCT Filed: Nov. 9, 2015

(86) PCT No.: PCT/CN2015/094147
§ 371 (c)(1),
(2) Date: May 7, 2018

(87) PCT Pub. No.: WO2017/079883
PCT Pub. Date: May 18, 2017

(65) Prior Publication Data
US 2018/0332519 A1   Nov. 15, 2018

(51) Int. Cl.
*H04W 36/30*   (2009.01)
*H04W 76/14*   (2018.01)
(Continued)

(52) U.S. Cl.
CPC .......... *H04W 36/30* (2013.01); *H04B 17/318* (2015.01); *H04L 67/16* (2013.01);
(Continued)

(58) Field of Classification Search
None
See application file for complete search history.

(56) References Cited

U.S. PATENT DOCUMENTS 10,455,464 B1 * 10/2019 Oroskar ................ H04B 17/40
2011/0199927 A1 *  8/2011 Frost .................... H04B 7/2606
                                                                    370/252
(Continued)

FOREIGN PATENT DOCUMENTS

CN   104285457 A    1/2015
EP     2665298 A1  11/2013
(Continued)

OTHER PUBLICATIONS

XP051017803 C1-153664 SungHoon Jung,"ProSe UE-to-Network relay",3GPP TSG CT WG1 Meeting #94,Belgrade (Serbia), Oct. 12-16, 2015,total 2 pages.
(Continued)

*Primary Examiner* — Chi H Pham
*Assistant Examiner* — Vladislav Y Agureyev
(74) *Attorney, Agent, or Firm* — Fish & Richardson P.C.

(57) ABSTRACT

The present disclosure describes methods, devices, and systems for signal strength measurement. An example method includes: broadcasting, by a first relay device, a first message, wherein the first message is used by a first remote device to discover the first relay device; establishing, by the first relay device, a connection to the first remote device; and sending, by the first relay device, a second message, wherein the second message is used by the first remote device to measure signal strength of a link between the first remote device and the first relay device.

6 Claims, 14 Drawing Sheets

(51) Int. Cl.
- *H04W 24/00* (2009.01)
- *H04W 8/00* (2009.01)
- *H04L 29/08* (2006.01)
- *H04B 17/318* (2015.01)
- *H04W 36/16* (2009.01)
- *H04W 88/04* (2009.01)
- *H04W 4/80* (2018.01)

(52) U.S. Cl.
CPC ........... *H04W 8/005* (2013.01); *H04W 24/00* (2013.01); *H04W 36/165* (2013.01); *H04W 76/14* (2018.02); *H04W 4/80* (2018.02); *H04W 88/04* (2013.01)

(56) References Cited

U.S. PATENT DOCUMENTS

| | | | |
|---|---|---|---|
| 2013/0021905 A1 | 1/2013 | Schramm | |
| 2015/0029866 A1* | 1/2015 | Liao | H04W 4/023 370/241 |
| 2015/0045033 A1 | 2/2015 | Kim et al. | |
| 2015/0126188 A1 | 5/2015 | Lindoff et al. | |
| 2016/0088668 A1* | 3/2016 | Kim | H04W 48/16 370/315 |
| 2016/0135203 A1 | 5/2016 | Kim et al. | |
| 2016/0285539 A1* | 9/2016 | Sadiq | H04W 8/005 |
| 2016/0309401 A1* | 10/2016 | Baek | H04W 48/16 |
| 2016/0330603 A1* | 11/2016 | Chuang | H04B 7/15507 |
| 2016/0337954 A1* | 11/2016 | Gulati | H04W 76/14 |
| 2016/0381720 A1* | 12/2016 | Baek | H04W 8/14 370/329 |
| 2017/0013653 A1* | 1/2017 | Suzuki | H04W 24/04 |
| 2017/0126682 A1* | 5/2017 | Wong | H04W 12/04 |
| 2017/0142741 A1* | 5/2017 | Kaur | H04W 56/002 |
| 2017/0164332 A1* | 6/2017 | Kim | H04W 76/10 |
| 2017/0195877 A1* | 7/2017 | Lehtovirta | H04W 12/04 |
| 2018/0048986 A1* | 2/2018 | Adachi | H04W 8/00 |
| 2018/0092017 A1* | 3/2018 | Freda | H04W 76/14 |
| 2018/0098370 A1* | 4/2018 | Bangolae | H04W 76/14 |
| 2018/0124674 A1* | 5/2018 | Vutukuri | H04W 40/22 |
| 2020/0059901 A1* | 2/2020 | Larsson | H04W 72/085 |
| 2020/0068580 A1* | 2/2020 | Tang | H04W 76/14 |

FOREIGN PATENT DOCUMENTS

| | | | | |
|---|---|---|---|---|
| EP | 3270659 A4 * | 1/2018 | | H04W 8/00 |
| WO | 2014209182 A1 | 12/2014 | | |
| WO | 2015002456 A1 | 1/2015 | | |
| WO | 2015113355 A1 | 8/2015 | | |
| WO | WO-2017017887 A1 * | 2/2017 | | H04B 7/15557 |

OTHER PUBLICATIONS

XP051005269 R2-154798 Qualcomm Incorporated et al.,"Open Issues of ProSe UE-to-Network relay",3GPP TSG-RAN WG2 Meeting #91Bis,Malmo, Sweden, Oct. 5-9, 2015,total 4 pages.
Extended European Search Report issued in European Application No. 15908013.4 dated Sep. 25, 2018, 10 page.
R2-154695—ZTE, "Relay UE Selection and Reselection",3GPP TSG-RAN WG2 Meeting #91bis ,Malmö, Sweden, Oct. 5-9, 2015,total 4 pages.
R2-156578—Ericsson, "Relay reselection with Model B," 3GPP TSG-RAN WG2 #92, Nov. 16-20, 2015, 4 pages.
R2-153552—General Dynamics UK Ltd, "Behaviour of the UE-to-Network relay," 3GPP TSG-RAN2#91, Beijing, China, Aug. 24-28, 2015, 4 pages.
R2-151169—ZTE, "Considerations on the UE-to-Network Relays," 3GPP TSG RAN WG2 #89bis, Apr. 20-24, 2015, 7 pages.
R2-156610—ZTE, "Remaining issue on ProSe one to one communication Layer-2 ID", 3GPP TSG RAN WG2 #92, Anaheim, USA, Nov. 16-20, 2015, 4 pages.
Office Action issued in Japanese Application No. 2018-522125 dated Apr. 9, 2019, 7 pages (with English translation).
Office Action issued in Korean Application No. 10-2018-7014891 dated Apr. 10, 2019, 12 pages (with English translation).
R1-134188 Samsung,"Network-to-UE relay for D2D communication",3GPP TSG RAN WG1 Meeting #74bis, Guangzhou, China, Oct. 7-11, 2013,total 3 pages.
R2-133324 Samsung,"Relay for D2D communication",3GPP TSG-RAN WG2 #83bis,Ljubljana, Slovenia, Oct. 7-11, 2013,total 3 pages.
S2-153129_R2-154998 SungHoon Jung,"ProSe UE-to-Network relay",dated Oct. 2015,total 2 pages.
3GPP TS 23.303 V13.1.1 (Sep. 2015),3rd Generation Partnership Project;Technical Specification Group Services and System Aspects;Proximity-based services (ProSe);Stage 2 (Release 13),dated Sep. 2015,total 116 pages.
3GPP TS 24.334 V13.1.0 (Sep. 2015),3rd Generation Partnership Project;Technical Specification Group Core Network and Terminals;Proximity-services (ProSe) User Equipment (UE) to ProSe function protocol aspects;Stage 3(Release 13),dated Sep. 2015,total 143 pages.
3GPP TS 23.334 V13.3.0 (Sep. 2015),3rd Generation Partnership Project;Technical Specification Group Core Network and Terminals;IP Multimedia Subsystem (IMS) Application Level Gateway (IMS-ALG)—IMS Access Gateway (IMS-AGW) interface:Procedures descriptions (Release 13),dated Sep. 2015,total 169 pages.
International Search Report issue in International Application No. PCT/CN2015/094147 dated Aug. 2, 2016, 7 pages.

* cited by examiner

SIGNAL STRENGTH MEASUREMENT METHOD AND DEVICE

CROSS-REFERENCE TO RELATED APPLICATIONS

This application is a National Stage of International Application No. PCT/CN2015/094147, filed on Nov. 9, 2015, which is hereby incorporated by reference in its entirety.

TECHNICAL FIELD

The present invention relates to the field of mobile communications technologies, and in particular, to a signal strength measurement method and a device.

BACKGROUND

User equipment (User Equipment, UE) that obtains no network service directly provided by an evolved universal mobile telecommunications system terrestrial radio access network (Evolved Universal Mobile Telecommunications System Terrestrial Radio Access Network, E-UTRAN) may use a device-to-device (device-to-device, D2D) technology to discover and connect to UE that provides a relay service. The UE that provides the relay service is also referred to as a proximity-based service user equipment-to-network relay (ProSe UE-to-NW relay). In this way, the UE that is not directly served by the E-UTRAN may obtain, in a relay manner, a network service provided by the E-UTRAN. The UE that accepts the relay service is also referred to as remote user equipment (remote UE).

Referring to FIG. 1, FIG. 1 is a schematic diagram in which a remote device receives, by using a relay device, a network service provided by an E-UTRAN. It can be learned from FIG. 1 that, the remote device establishes a connection to the relay device, the relay device is connected to a base station (for example, an eNodeB) by using a Uu interface, the base station is connected to an evolved packet core (Evolved Packet Core, EPC), and the EPC is connected to a public safety application server (Public Safety AS) by using an SGi interface. After the remote device establishes the connection to the relay device, a link between the remote device and the relay device may be referred to as a PC5 link. The remote device needs to measure signal strength of the PC5 link.

In a current D2D technology, two models in which remote UE accesses a ProSe UE-to-NW relay are defined, for example, are respectively referred to as Model (Model) A and Model B, and are separately described as follows:

Model A:

UEs in two roles are defined to execute a discovery process.

In terms of a first role, UE in the role may be referred to as announcing (Announcing) UE, and is configured to broadcast a specific message. UE interested in the message broadcast by the announcing UE may discover the announcing UE. In a relay model, a ProSe UE-to-NW relay may play the role of the announcing UE.

In terms of a second role, UE in the role may be referred to as monitoring (Monitoring) UE, and is configured to monitor a specific message broadcast by announcing UE in proximity. In the relay model, remote UE may play the role of the monitoring UE.

In Model A, all ProSe UE-to-Network relays may continuously broadcast announcement messages (Announcement message), and services that the ProSe UE-to-Network relays can provide may be indicated in the announcement messages. Each remote UE may select, for access according to the received announcement messages, a ProSe UE-to-Network relay that meets a condition (for example, can provide a service required by the remote UE).

In the prior art, after a ProSe UE-to-Network relay establishes a connection to remote UE, if the ProSe UE-to-Network relay cannot continue providing a relay service, the ProSe UE-to-Network relay may no longer broadcast an announcement message. Therefore, the remote UE cannot measure signal strength of a link between the remote UE and the connected ProSe UE-to-Network relay.

Model B:

UEs in two roles are also defined to execute a discovery process.

In terms of a first role, UE in the role may be referred to as discoverer (Discoverer) UE, and is configured to send a request message. The request message may include content in which the discoverer UE is interested. For example, the content may be a service required by the discoverer UE. In a relay model, remote UE may play the role of the discoverer UE.

In terms of a second role, the role may be referred to as discoveree (Discoveree) UE, is configured to monitor a request message sent by discoverer UE in proximity, and may reply with a specific response message if a request in a request message of one or some discoverer UEs is met. In the relay model, a ProSe UE-to-Network relay may play the role of the discoveree UE.

In Model B, remote UE first sends a solicitation request (Solicitation request) message, and a service required by the remote UE may be indicated in a solicitation request. Therefore, ProSe UE-to-Network relays that meet a condition requested by the remote UE (for example, can provide the service indicated in the solicitation request) may reply with response messages (Response message), and the remote UE selects a ProSe UE-to-Network relay for access from the ProSe UE-to-Network relays according to the received response messages.

In the prior art, if there is no connection request information of remote UE after a ProSe UE-to-Network relay establishes a connection to remote UE, the ProSe UE-to-Network relay no longer sends a response message.

Model A and Model B have the following problem:

Whether in Model A or Model B, it cannot be ensured that a ProSe UE-to-Network relay continuously sends a message (an announcement message in Model A or a response message in Model B) to remote UE after establishing a connection to the remote UE. Therefore, after the ProSe UE-to-Network relay establishes the connection to the remote UE, the remote UE cannot further measure signal strength of a PC5 link. Even if the signal strength of the current PC5 link is relatively weak, the remote UE neither can learn that the signal strength of the current PC5 link is relatively weak, and nor can reselect another ProSe UE-to-Network relay for access. Consequently, quality of a network accepted by the remote UE is relatively poor, and network use by the remote UE is affected. Even if there is a ProSe UE-to-Network relay that can provide relatively strong signal strength, the remote UE cannot perform access. In addition, link utilization is relatively low, overall network planning is improper, and system reliability is relatively low.

SUMMARY

This application provides a signal strength measurement method and a device, so as to ensure that remote UE can measure signal strength of a link between the remote UE and a ProSe UE-to-NW relay.

According to a first aspect, a first signal strength measurement method is provided, and includes:

broadcasting, by a first relay device, a first message, where the first message is used by a remote device to discover the first relay device;

establishing, by the first relay device, a connection to a first remote device in the remote device; and sending, by the first relay device, a second message, where the second message is used by the remote device to measure signal strength of a link between the remote device and the first relay device.

In this application, the relay device further sends the second message after establishing the connection to the remote device, so that the remote device may measure the signal strength of the link between the remote device and the relay device after receiving the second message. That is, after the remote device establishes a connection to the relay device, the relay device may further continue to send the second message, so that the remote device may continue to measure the signal strength between the remote device and the relay device, so as to use the signal strength as a basis for determining whether a relay device needs to be reselected. Therefore, it is ensured that the remote device can obtain good service quality, utilization of a link with relatively high quality is improved, and system reliability is improved.

With reference to the first aspect, in a first possible implementation of the first aspect, the second message is the same as the first message, the first message and the second message each carry an indication whether the first relay device reaches an upper access limit, and the first message and the second message are used by the remote device to discover the first relay device and to measure the signal strength of the link between the remote device and the first relay device.

With reference to the first possible implementation of the first aspect, in a second possible implementation of the first aspect, the indication whether the first relay device reaches the upper access limit is specifically used to indicate:

the first relay device cannot provide a relay service for the remote device when the first relay device reaches the upper access limit; or the first relay device can provide a relay service for the remote device when the first relay device does not reach the upper access limit.

That is, in this application, the indication may be added to the first message and the second message. When the first relay device may further provide the relay service for another remote device, a first indication in the first message and/or the second message that are/is sent by the first relay device may be used to indicate that the first relay device can provide the relay service. After the first relay device cannot provide the relay service for another remote device, a first indication in the first message and/or the second message that are/is sent by the first relay device may be used to indicate that the first relay device cannot provide the relay service for the remote device. Therefore, if the first relay device broadcasts the first message or the second message, after receiving the first message, a remote device that has not accessed the first relay device may know, according to the first indication, whether the first relay device can be further accessed, so that the remote device is prevented from doing unnecessary work, device power consumption is reduced, information interaction processes are reduced, and transmission resources are saved.

With reference to the first aspect, in a third possible implementation of the first aspect, after the establishing, by the first relay device, a connection to the first remote device, the method further includes:

if the first relay device can provide a relay service for the remote device, sending, by the first relay device, the second message when sending the first message, where the second message carries an identifier of the first relay device; or sending, by the first relay device, the second message if the first relay device can provide a relay service for the remote device, where the second message is the same as the first message, and the first message or the second message is used by the remote device to discover the first relay device and to measure the signal strength of the link between the remote device and the first relay device; or when the first relay device cannot provide a relay service for the remote device, stopping, by the first relay device, sending the second message, and starting to send a third message, where the third message carries an identifier of the first relay device; or if the first relay device cannot provide a relay service for the remote device, stopping, by the first relay device, sending the first message, and starting to send the second message, where the second message carries an identifier of the first relay device.

That is, before establishing the connection to the remote device, the first relay device broadcasts the first message. After the connection to the remote device is established, there are two message sending manners. Manner 1: Before reaching an upper access limit, the first relay device continues broadcasting the first message and simultaneously sends the second message; and after reaching the upper access limit, the first relay device may stop broadcasting the first message and send only the second message. In this manner, the relay device may simultaneously broadcast the first message and the second message. In this way, a remote device that has not accessed the first relay device may choose, according to the first message, to access the relay device, and a remote device that has accessed the first relay device may measure signal strength according to the first message or the second message. Therefore, requirements of different remote devices can be met. Manner 2: After establishing the connection to the first remote device, the first relay device stops sending the first message. Before reaching an upper access limit, the first relay device sends the second message; and after reaching the upper access limit, the relay device may stop sending the second message, and start to send the third message. In this manner, after establishing the connection to the first remote device, the first relay device may first send the second message, and then send the third message after reaching the upper access limit. In this way, the first relay device needs to send only one type of message each time, so that load on the relay device is relatively light.

With reference to the third possible implementation of the first aspect, in a fourth possible implementation of the first aspect, the identifier of the first relay device is used by the first remote device to identify the first message, the second message, or the third message that is sent by the first relay device; and the identifier of the first relay device includes at least one of a first codeword used to identify the first relay device or the identifier of the first relay device.

The identifier of the first relay device is added to the second message and the third message. In this way, a remote device that has accessed the first relay device may identify, from received messages, a message sent by the first relay device, so as to measure a signal according to the message sent by the first relay device. Because messages sent by other relay devices do not carry the identifier of the first relay device, the remote device that has accessed the first relay device may ignore the messages, so as to reduce workload required by the remote device that has accessed the first relay device, and reduce load on the remote device.

With reference to any one of the first aspect, or the first possible implementation to the fourth possible implementation of the first aspect, in a fifth possible implementation of the first aspect, the sending, by the first relay device, a second message includes:

broadcasting, by the first relay device, the second message; or sending, by the first relay device, the second message to the remote device in a unicast or multicast manner.

That is, the first relay device may relatively flexibly send the second message in different manners.

According to a second aspect, a second signal strength measurement method is provided, and includes:

receiving, by a relay device, a first message sent by a first remote device, where the first message is used by the first remote device to request the relay device to provide a relay service;

sending, by the relay device, a second message, where the second message is used by the first remote device to discover the relay device;

establishing, by a first relay device in the relay device, a connection to the first remote device; and receiving, by the first relay device, a third message sent by the first remote device, where the third message is used by the first remote device to request the first relay device to provide a measurement service.

In Model B, when the first remote device needs to measure signal strength of a link between the first remote device and the first relay device (for example, when the first remote device may receive triggering of a user, or when the first remote device may perform periodical measurement) after establishing a connection to the first relay device, the first remote device may send the third message to the first relay device. The third message is used to request the first relay device to provide the measurement service. In this way, when the first remote device needs to measure a signal, the first remote device sends the third message to the first relay device. After receiving the third message, the first relay device sends a measurement message (hereinafter referred to as a fourth message) required by the first remote device. Therefore, the first relay device does not need to continuously send the measurement message to the first remote device, so as to save transmission resources, and prevent the first remote device from receiving excessive redundant measurement messages without a need to perform measurement.

With reference to the second aspect, in a first possible implementation of the second aspect, after the receiving, by the first relay device, a third message sent by the first remote device, the method further includes:

if the third message carries an identifier of the first relay device, determining, by the first relay device, that the first relay device is to send a fourth message to the remote device, where the fourth message is used by the first remote device to measure signal strength of a link between the first remote device and the first relay device.

Because the first remote device wants to request a measurement service provided by a relay device (that is, the first relay device) connected to the first remote device, and because the first remote device sends the third message in a broadcast manner, multiple relay devices may be able to receive the third message. If all the relay devices that receive the third message reply with fourth messages, load on the first remote device and that on another relay device are increased, and transmission resources are relatively wasted. Therefore, in this application, the third message may carry the identifier of the first relay device, so that a relay device that receives the third message may first determine the identifier of the relay device that is carried in the third message. If the identifier of the relay device that is carried in the third message is not an identifier of the relay device, the relay device may not respond to the third message, for example, may discard the third message, so as to avoid causing interference for the first remote device and save transmission resources.

With reference to the second aspect, in a second possible implementation of the second aspect, after the receiving, by the first relay device, a third message sent by the first remote device, the method further includes:

if the third message carries the identifier for requesting to provide the measurement service, determining, by the first relay device, that the third message is sent by the first remote device, and sending, by the first relay device, a fourth message to the first remote device, where the fourth message is used by the first remote device to measure signal strength of a link between the first remote device and the first relay device.

The third message may carry the identifier for requesting the measurement service, so that a relay device that receives the third message may first determine the identifier carried in the third message. If the identifier carried in the third message is the identifier for requesting the measurement service, the relay device that is not connected to the first remote device may not respond to the third message, for example, may discard the third message, so as to avoid causing interference for the first remote device and save transmission resources. In addition, because the third message is used to request to provide the measurement service, the third message may carry the identifier for requesting the measurement service. In this way, after receiving the third message, the first relay device may also determine how to respond to the third message.

With reference to the first possible implementation or the second possible implementation of the second aspect, in a third possible implementation of the second aspect, the fourth message carries the identifier of the first relay device, and the identifier of the first relay device includes at least one of a first codeword used to identify the first relay device or the identifier of the first relay device.

That is, the identifier of the first relay device may be identifiers of different types provided that the identifiers can be used to uniquely identify the first relay device.

According to a third aspect, a third signal strength measurement method is provided, and includes:

receiving, by a relay device, a first message sent by a first remote device, where the first message is used by the first remote device to request the relay device to provide a relay service;

sending, by the relay device, a second message, where the second message is used by the first remote device to discover the relay device;

establishing, by a first relay device in the relay device, a connection to the first remote device; and sending, by the first relay device, a fourth message, where the fourth message is used by the first remote device to measure signal strength of a link between the first remote device and the first relay device.

After the first remote device establishes a connection to the first relay device, the first relay device may actively send the fourth message without requiring the first remote device to do excessive work (for example, to send a request to the first relay device), so that the first remote device may receive the fourth message, and the fourth message may be used by the first remote device to measure the signal strength of the link between the first remote device and the first relay device. Therefore, load on the first remote device is reduced.

With reference to the third aspect, in a first possible implementation of the third aspect, the fourth message carries an identifier of the first relay device, and the identifier of the first relay device includes at least one of a first codeword used to identify the first relay device or the identifier of the first relay device.

If the first relay device sends the fourth message in a broadcast manner, multiple remote devices may be able to receive the fourth message. However, the fourth message may be considered as interference for a remote device that does not need to measure signal strength. Therefore, in this application, the fourth message may carry an identifier for requesting a measurement service, and a remote device that receives the fourth message may first determine the identifier carried in the fourth message. If the identifier carried in the fourth message is not an identifier of a relay device accessed by the remote device, the remote device that is not connected to the first relay device may not respond to the fourth message, for example, may discard the fourth message, so as to avoid causing interference for another remote device.

According to a fourth aspect, a fourth signal strength measurement method is provided, and includes:

receiving, by a first remote device, a first message broadcast by a relay device, where the first message is used by the first remote device to discover the relay device;

establishing, by the first remote device, a connection to a first relay device in the relay device; and receiving, by the first remote device, a second message sent by the first relay device, where the second message is used by the first remote device to measure signal strength of a link between the first remote device and the first relay device.

With reference to the fourth aspect, in a first possible implementation of the fourth aspect, the second message is the same as the first message, the first message and the second message each carry an indication whether the first relay device reaches an upper access limit, and the first message and the second message are used by the first remote device to discover the first relay device and to measure the signal strength of the link between the first remote device and the first relay device.

With reference to the first possible implementation of the fourth aspect, in a second possible implementation of the fourth aspect, the indication whether the first relay device reaches the upper access limit is specifically used to indicate:

the first relay device cannot provide a relay service for the remote device when the first relay device reaches the upper access limit; or the first relay device can provide a relay service for the remote device when the first relay device does not reach the upper access limit.

With reference to the fourth aspect, in a third possible implementation of the fourth aspect, after the establishing, by the first remote device, a connection to the first relay device, the method further includes:

if the first relay device can provide a relay service for the remote device, monitoring and receiving, by the first remote device, the first message or the second message, where the first message and the second message each carry an identifier of the first relay device; or if the first relay device can provide a relay service for the remote device, monitoring and receiving, by the first remote device, the second message, where the second message is the same as the first message, and the first message or the second message is used by the first remote device to discover the first relay device and to measure the signal strength of the link between the first remote device and the first relay device; or when the first relay device cannot provide a relay service for the remote device, stopping, by the first remote device, monitoring the second message, and starting to monitor a third message, where the third message carries an identifier of the first relay device; or monitoring, by the first remote device, the second message if the first relay device cannot provide a relay service for the remote device, where the second message carries an identifier of the first relay device.

With reference to the third possible implementation of the fourth aspect, in a fourth possible implementation of the fourth aspect, the identifier of the first relay device is used by the first remote device to identify the first message, the second message, or the third message that is sent by the first relay device; and the identifier of the first relay device includes at least one of a first codeword used to identify the first relay device or the identifier of the first relay device.

According to a fifth aspect, a fifth signal strength measurement method is provided, and includes:

sending, by a first remote device, a first message to a relay device, where the first message is used by the first remote device to request the relay device to provide a relay service;

receiving, by the first remote device, a second message sent by the relay device, where the second message is used by the first remote device to discover the relay device;

establishing, by the first remote device, a connection to a first relay device in the relay device; and sending, by the first remote device, a third message to the first relay device, where the third message is used by the first remote device to request the first relay device to provide a measurement service.

With reference to the fifth aspect, in a first possible implementation of the fifth aspect, after the sending, by the first remote device, a third message to the first relay device, the method further includes:

if the third message carries an identifier of the first relay device, determining, by the first remote device, to receive a fourth message sent by the first relay device, where the fourth message is used by the first remote device to measure signal strength of a link between the first remote device and the first relay device.

With reference to the fifth aspect, in a second possible implementation of the fifth aspect, after the sending, by the first remote device, a third message to the first relay device, the method further includes:

if the third message carries the identifier for requesting the measurement service, receiving, by the first remote device, a fourth message sent by the first relay device, where the fourth message is used by the first remote device to measure signal strength of a link between the first remote device and the first relay device.

With reference to the first possible implementation or the second possible implementation of the fifth aspect, in a third possible implementation of the fifth aspect, the fourth message carries the identifier of the first relay device, and the identifier of the first relay device includes at least one of a first codeword used to identify the first relay device or the identifier of the first relay device.

According to a sixth aspect, a sixth signal strength measurement method is provided, and includes:

sending, by a first remote device, a first message to a relay device, where the first message is used by the first remote device to request the relay device to provide a relay service;

receiving, by the first remote device, a second message sent by the relay device, where the second message is used by the first remote device to discover the relay device;

establishing, by the first remote device, a connection to a first relay device in the relay device; and receiving, by the first remote device, a fourth message sent by the first relay device, where the fourth message is used by the first remote device to measure signal strength of a link between the first remote device and the first relay device.

With reference to the sixth aspect, in a first possible implementation of the sixth aspect, the fourth message carries an identifier of the first relay device, and the identifier of the first relay device includes at least one of a first codeword used to identify the first relay device or the identifier of the first relay device.

According to a seventh aspect, a first relay device is provided, and includes:

a sending module, configured to broadcast a first message, where the first message is used by a remote device to discover the relay device; and a processing module, configured to establish a connection to a first remote device in the remote device, where the sending module is further configured to send a second message, where the second message is used by the remote device to measure signal strength of a link between the remote device and the relay device.

With reference to the seventh aspect, in a first possible implementation of the seventh aspect, the second message is the same as the first message, the first message and the second message each carry an indication whether the relay device reaches an upper access limit, and the first message and the second message are used by the remote device to discover the relay device and to measure the signal strength of the link between the remote device and the relay device.

With reference to the first possible implementation of the seventh aspect, in a second possible implementation of the seventh aspect, the indication whether the relay device reaches the upper access limit is specifically used to indicate:

the relay device cannot provide a relay service for the remote device when the relay device reaches the upper access limit; or the relay device can provide a relay service for the remote device when the relay device does not reach the upper access limit.

With reference to the seventh aspect, in a third possible implementation of the seventh aspect, the sending module is further configured to: if the relay device can provide a relay service for the remote device after establishing the connection to the first remote device in the remote device, send the second message when sending the first message, where the second message carries an identifier of the relay device; or the sending module is further configured to: send the second message if the relay device can provide a relay service for the remote device after establishing the connection to the first remote device in the remote device, where the second message is the same as the first message, and the first message or the second message is used by the remote device to discover the relay device and to measure the signal strength of the link between the remote device and the relay device; or when the relay device cannot provide a relay service for the remote device, stop sending the second message, and start to send a third message, where the third message carriers an identifier of the relay device; or the sending module is further configured to: if the first relay device cannot provide a relay service for the remote device after establishing the connection to the first remote device in the remote device, stop sending the first message, and start to send the second message, where the second message carries an identifier of the first relay device.

With reference to the third possible implementation of the seventh aspect, in a fourth possible implementation of the seventh aspect, the identifier of the relay device is used by the first remote device to identify the first message, the second message, or the third message that is sent by the relay device; and the identifier of the relay device includes at least one of a first codeword used to identify the relay device or the identifier of the relay device.

With reference to any one of the seventh aspect, or the first possible implementation to the fourth possible implementation of the seventh aspect, in a fifth possible implementation of the seventh aspect, the sending module is configured to:

broadcast the second message; or send the second message to the remote device in a unicast or multicast manner.

According to an eighth aspect, a second relay device is provided, and includes:

a receiving module, configured to receive a first message sent by a first remote device, where the first message is used by the first remote device to request the relay device to provide a relay service;

a sending module, configured to send a second message, where the second message is used by the first remote device to discover the relay device; and a processing module, configured to establish a connection to the first remote device, where the receiving module is further configured to receive a third message sent by the first remote device, where the third message is used by the first remote device to request the relay device to provide a measurement service.

With reference to the eighth aspect, in a first possible implementation of the eighth aspect, after the receiving module receives the third message sent by the first remote device, if the third message received by the receiving module carries an identifier of the relay device, the processing module is further configured to determine that the sending module is to send a fourth message to the first remote device, where the fourth message is used by the first remote device to measure signal strength of a link between the first remote device and the relay device.

With reference to the eighth aspect, in a second possible implementation of the eighth aspect, after the receiving module receives the third message sent by the first remote device, if the third message carries the identifier for requesting to provide the measurement service, the processing module is further configured to determine that the third message is sent by the first remote device; and the sending module is further configured to send a fourth message to the first remote device, where the fourth message is used by the first remote device to measure signal strength of a link between the first remote device and the relay device.

With reference to the first possible implementation or the second possible implementation of the eighth aspect, in a third possible implementation of the eighth aspect, the fourth message carries the identifier of the first relay device, and the identifier of the first relay device includes at least one of a first codeword used to identify the first relay device or the identifier of the first relay device.

According to a ninth aspect, a third relay device is provided, and includes:

a receiving module, configured to receive a first message sent by a first remote device, where the first message is used by the first remote device to request the relay device to provide a relay service;

a sending module, configured to send a second message, where the second message is used by the first remote device to discover the relay device; and a processing module, configured to establish a connection to the first remote device, where the sending module is further configured to send a fourth message, where the fourth message is used by the first remote device to measure signal strength of a link between the first remote device and the relay device.

With reference to the ninth aspect, in a first possible implementation of the ninth aspect, the fourth message carries an identifier of the first relay device, and the identifier of the first relay device includes at least one of a first codeword used to identify the first relay device or the identifier of the first relay device.

According to a tenth aspect, a first remote device is provided, and includes:

a receiving module, configured to receive a first message broadcast by a relay device, where the first message is used by the remote device to discover the relay device; and a processing module, configured to establish a connection to a first relay device in the relay device, where the receiving module is further configured to receive a second message sent by the first relay device, where the second message is used by the remote device to measure signal strength of a link between the remote device and the first relay device.

With reference to the tenth aspect, in a first possible implementation of the tenth aspect, the second message is the same as the first message, the first message and the second message each carry an indication whether the first relay device reaches an upper access limit, and the first message and the second message are used by the remote device to discover the first relay device and to measure the signal strength of the link between the remote device and the first relay device.

With reference to the first possible implementation of the tenth aspect, in a second possible implementation of the tenth aspect, the indication whether the first relay device reaches the upper access limit is specifically used to indicate:

the first relay device cannot provide a relay service for the remote device when the first relay device reaches the upper access limit; or the first relay device can provide a relay service for the remote device when the first relay device does not reach the upper access limit.

With reference to the tenth aspect, in a third possible implementation of the tenth aspect, the receiving module is further configured to: if the first relay device can provide a relay service for the remote device after the remote device establishes the connection to the first relay device, monitor and receive, by the remote device, the first message or the second message, where the first message and the second message each carry an identifier of the first relay device; or the receiving module is further configured to: if the first relay device can provide a relay service for the remote device, monitor and receive, by the remote device, the second message, where the second message is the same as the first message, and the first message or the second message is used by the remote device to discover the first relay device and to measure the signal strength of the link between the remote device and the first relay device; or when the first relay device cannot provide a relay service for the remote device, stop monitoring the second message, and start to monitor a third message, where the third message carries an identifier of the first relay device; or the receiving module is further configured to: if the first relay device cannot provide a relay service for the remote device, stop monitoring the second message, where the second message carries an identifier of the first relay device.

With reference to the third possible implementation of the tenth aspect, in a fourth possible implementation of the tenth aspect, the identifier of the first relay device is used by the first remote device to identify the first message, the second message, or the third message that is sent by the first relay device; and the identifier of the first relay device includes at least one of a first codeword used to identify the first relay device or the identifier of the first relay device.

According to an eleventh aspect, a second remote device is provided, and includes:

a sending module, configured to send a first message to a relay device, where the first message is used by the remote device to request the relay device to provide a relay service;

a receiving module, configured to receive a second message sent by the relay device, where the second message is used by the remote device to discover the relay device; and a processing module, configured to establish a connection to a first relay device in the relay device, where the sending module is further configured to send a third message to the first relay device, where the third message is used by the remote device to request the first relay device to provide a measurement service.

With reference to the eleventh aspect, in a first possible implementation of the eleventh aspect, after the sending module sends the third message to the first relay device, if the third message carries an identifier of the first relay device, the processing module is further configured to:

determine to receive a fourth message sent by the first relay device, where the fourth message is used by the remote device to measure signal strength of a link between the remote device and the first relay device.

With reference to the eleventh aspect, in a second possible implementation of the eleventh aspect, the receiving module is further configured to:

after the sending module sends the third message to the first relay device, if the third message carries the identifier for requesting the measurement service, the receiving module is further configured to receive a fourth message sent by the first relay device, where the fourth message is used by the remote device to measure signal strength of a link between the remote device and the first relay device.

With reference to the first possible implementation or the second possible implementation of the eleventh aspect, in a third possible implementation of the eleventh aspect, the fourth message carries the identifier of the first relay device, and the identifier of the first relay device includes at least one of a first codeword used to identify the first relay device or the identifier of the first relay device.

According to a twelfth aspect, a third remote device is provided, and includes:

a sending module, configured to send a first message to a relay device, where the first message is used by the remote device to request the relay device to provide a relay service;

a receiving module, configured to receive a second message sent by the relay device, where the second message is used by the remote device to discover the relay device; and a processing module, configured to establish a connection to a first relay device in the relay device, where the receiving module is further configured to receive a fourth message sent by the first relay device, where the fourth message is used by the remote device to measure signal strength of a link between the remote device and the first relay device.

With reference to the twelfth aspect, in a first possible implementation of the twelfth aspect, the fourth message carries an identifier of the first relay device, and the identifier of the first relay device includes at least one of a first codeword used to identify the first relay device or the identifier of the first relay device.

According to a thirteenth aspect, a fourth relay device is provided, and includes a memory, a processor, and a transmitter, where the memory is configured to store an instruction; and the processor is configured to read the instruction from the memory to execute the following operations:

broadcasting a first message by using the transmitter, where the first message is used by a remote device to discover the relay device;

establishing a connection to a first remote device in the remote device, and sending a second message by using the transmitter, where the second message is used by the remote device to measure signal strength of a link between the remote device and the relay device.

With reference to the thirteenth aspect, in a first possible implementation of the thirteenth aspect, the second message is the same as the first message, the first message and the second message each carry an indication whether the relay device reaches an upper access limit, and the first message and the second message are used by the remote device to discover the relay device and to measure the signal strength of the link between the remote device and the relay device.

With reference to the first possible implementation of the thirteenth aspect, in a second possible implementation of the thirteenth aspect, the indication whether the first relay device reaches the upper access limit is specifically used to indicate:

the relay device cannot provide a relay service for the remote device when the relay device reaches the upper access limit; or the relay device can provide a relay service for the remote device when the relay device does not reach the upper access limit.

With reference to the thirteenth aspect, in a third possible implementation of the thirteenth aspect, the processor is configured to:

if the relay device can provide a relay service for the remote device after establishing the connection to the first remote device, send the second message when sending the first message by using the transmitter, where the second message carries an identifier of the relay device; or if the relay device can provide a relay service for the remote device after establishing the connection to the first remote device, send the second message by using the transmitter, where the second message is the same as the first message, and the first message and the second message are used by the remote device to discover the relay device and to measure the signal strength of the link between the remote device and the relay device; or when the relay device cannot provide a relay service for the remote device, stop sending the second message by using the transmitter, and start to send a third message by using the transmitter, where the third message carriers an identifier of the relay device; or if the relay device cannot provide a relay service for the remote device after establishing the connection to the first remote device, stop sending the first message by using the transmitter, and start to send the second message, where the second message carries an identifier of the first relay device.

With reference to the third possible implementation of the thirteenth aspect, in a fourth possible implementation of the thirteenth aspect, the identifier of the first relay device is used by the first remote device to identify the first message, the second message, or the third message that is sent by the relay device; and the identifier of the first relay device includes at least one of a first codeword used to identify the relay device or the identifier of the relay device.

With reference to any one of the thirteenth aspect, or the first possible implementation to the fourth possible implementation of the thirteenth aspect, in a fifth possible implementation of the thirteenth aspect, the processor is configured to:

broadcast the second message by using the transmitter; or send the second message to the remote device in a unicast or multicast manner by using the transmitter.

According to a fourteenth aspect, a fifth relay device is provided, and includes a memory, a receiver, a processor, and a transmitter, where the memory is configured to store an instruction; and the processor is configured to read the execution from the memory to execute the following operations:

receiving, by using the receiver, a first message sent by a first remote device, where the first message is used by the first remote device to request the relay device to provide a relay service;

sending a second message by using the transmitter, where the second message is used by the first remote device to discover the relay device;

establishing a connection to the first remote device; and receiving, by using the receiver, a third message sent by the first remote device, where the third message is used by the first remote device to request the relay device to provide a measurement service.

With reference to the fourteenth aspect, in a first possible implementation of the fourteenth aspect, after the receiver receives the third message sent by the first remote device, if the third message received by the receiver carries an identifier of the relay device, the processor is further configured to determine that the transmitter is to send a fourth message to the first remote device, where the fourth message is used by the first remote device to measure signal strength of a link between the first remote device and the relay device.

With reference to the fourteenth aspect, in a second possible implementation of the fourteenth aspect, after the receiver receives the third message sent by the first remote device, if the third message carries the identifier for requesting to provide the measurement service, the processor is further configured to: determine that the third message is sent by the first remote device, and send a fourth message to the first remote device by using the transmitter, where the fourth message is used by the first remote device to measure signal strength of a link between the first remote device and the relay device.

With reference to the first possible implementation or the second possible implementation of the fourteenth aspect, in a third possible implementation of the fourteenth aspect, the fourth message carries the identifier of the first relay device, and the identifier of the first relay device includes at least one of a first codeword used to identify the first relay device or the identifier of the first relay device.

According to a fifteenth aspect, a sixth relay device is provided, and includes a memory, a receiver, a processor, and a transmitter, where the memory is configured to store an instruction; and the processor is configured to read the instruction from the memory to execute the following operations:

receiving, by using the receiver, a first message sent by a first remote device, where the first message is used by the first remote device to request the relay device to provide a relay service;

sending a second message by using the transmitter, where the second message is used by the first remote device to discover the relay device;

establishing a connection to the first remote device; and sending a fourth message by using the transmitter, where the fourth message is used by the first remote device to measure signal strength of a link between the first remote device and the relay device.

With reference to the fifteenth aspect, in a first possible implementation of the fifteenth aspect, the fourth message carries an identifier of the relay device, and the identifier of the relay device includes at least one of a first codeword used to identify the relay device or the identifier of the relay device.

According to a sixteenth aspect, a fourth remote device is provided, and includes a memory, a receiver, and a processor, where the memory is configured to store an instruction; and the processor is configured to read the execution from the memory to execute the following operations:

receiving, by using the receiver, a first message broadcast by a relay device, where the first message is used by the remote device to discover the relay device;

establishing a connection to a first relay device in the relay device; and receiving, by using the receiver, a second message sent by the first relay device, where the second message is used by the remote device to measure signal strength of a link between the remote device and the first relay device.

With reference to the sixteenth aspect, in a first possible implementation of the sixteenth aspect, the second message is the same as the first message, the first message and the second message each carry an indication whether the first relay device reaches an upper access limit, and the first message and the second message are used by the remote device to discover the first relay device and to measure the signal strength of the link between the remote device and the first relay device.

With reference to the first possible implementation of the sixteenth aspect, in a second possible implementation of the sixteenth aspect, the indication whether the first relay device reaches the upper access limit is specifically used to indicate:

the first relay device cannot provide a relay service for the remote device when the first relay device reaches the upper access limit; or the first relay device can provide a relay service for the remote device when the first relay device does not reach the upper access limit.

With reference to the sixteenth aspect, in a third possible implementation of the sixteenth aspect, if the first relay device can provide a relay service for the remote device after the processor establishes the connection to the first relay device, the processor is further configured to: monitor and receive the first message or the second message by using the receiver, where the first message and the second message each carry an identifier of the first relay device; or after the processor establishes the connection to the first relay device, if the first relay device can provide a relay service for the remote device, the processor is further configured to: monitor and receive the second message by using the receiver, where the second message is the same as the first message, and the first message and the second message are used by the first remote device to discover the first relay device and to measure the signal strength of the link between the first remote device and the first relay device; or when the first relay device cannot provide a relay service for the remote device, stop monitoring the second message, and start to monitor a third message, where the third message carries an identifier of the first relay device; or when the first relay device cannot provide a relay service for the remote device after the processor establishes the connection to the first relay device, the processor is further configured to monitor the second message by using the receiver, where the second message carries an identifier of the first relay device.

With reference to the third possible implementation of the sixteenth aspect, in a fourth possible implementation of the sixteenth aspect, the identifier of the first relay device is used by the first remote device to identify the first message, the second message, or the third message that is sent by the first relay device; and the identifier of the first relay device includes at least one of a first codeword used to identify the first relay device or the identifier of the first relay device.

According to a seventeenth aspect, a fifth remote device is provided, and includes a memory, a processor, a receiver, and a transmitter, where the memory is configured to store an instruction; and the processor is configured to read the instruction from the memory to execute the following operations:

sending, by using the transmitter, a first message to a relay device, where the first message is used by the remote device to request the relay device to provide a relay service;

receiving, by using the receiver, a second message sent by the relay device, where the second message is used by the remote device to discover the relay device;

establishing a connection to a first relay device in the relay device; and sending a third message to the first relay device by using the transmitter, where the third message is used by the remote device to request the first relay device to provide a measurement service.

With reference to the seventeenth aspect, in a first possible implementation of the seventeenth aspect, the processor is further configured to:

after the processor sends the third message to the first relay device by using the transmitter, if the third message received by the receiver carries an identifier of the first relay device, the processor is further configured to determine to receive a fourth message sent by the first relay device, where the fourth message is used by the remote device to measure signal strength of a link between the remote device and the first relay device.

With reference to the seventeenth aspect, in a second possible implementation of the seventeenth aspect, after the processor sends the third message to the first relay device by using the transmitter, if the third message carries the identifier for requesting the measurement service, the processor is further configured to receive, by using the receiver, a fourth message sent by the first relay device, where the fourth message is used by the remote device to measure signal strength of a link between the remote device and the first relay device.

With reference to the first possible implementation or the second possible implementation of the seventeenth aspect, in a third possible implementation of the seventeenth aspect, the fourth message carries the identifier of the first relay device, and the identifier of the first relay device includes at least one of a first codeword used to identify the first relay device or the identifier of the first relay device.

According to an eighteenth aspect, a sixth remote device is provided, and includes a memory, a processor, a receiver, and a transmitter, where the memory is configured to store an instruction; and the processor is configured to read the instruction from the memory to execute the following operations:

sending, by using the transmitter, a first message to a relay device, where the first message is used by the remote device to request the relay device to provide a relay service;

receiving, by using the receiver, a second message sent by the relay device, where the second message is used by the remote device to discover the relay device;

establishing a connection to a first relay device in the relay device; and receiving, by using the receiver, a fourth message sent by the first relay device, where the fourth message is used by the remote device to measure signal strength of a link between the remote device and the first relay device.

With reference to the eighteenth aspect, in a first possible implementation of the eighteenth aspect, the fourth message carries an identifier of the first relay device, and the identifier of the first relay device includes at least one of a first codeword used to identify the first relay device or the identifier of the first relay device.

According to a nineteenth aspect, a first communications system is provided, and includes a relay device and a remote device, where the relay device is configured to broadcast a first message, where the first message is used by the remote device to discover the relay device, a first relay device in the relay device establishes a connection to a first remote device in the remote device, the first relay device sends a second message after establishing the connection, and the second message is used by the first remote device to measure signal strength of a link between the first remote device and the first relay device; and the remote device is configured to receive the first message broadcast by the relay device, where the first remote device in the remote device establishes a connection to the first relay device in the relay device; and after establishing the connection, the first remote device receives the second message sent by the first relay device.

According to a twentieth aspect, a second communications system is provided, and includes a relay device and a remote device, where the relay device is configured to: receive a first message sent by the remote device, where the first message is used by the remote device to request the relay device to provide a relay service; and send a second message, where the second message is used by the remote device to discover the relay device; a first relay device in the relay device establishes a connection to a first remote device in the remote device; after establishing the connection, the first relay device receives a third message sent by the first remote device; and the third message is used by the first remote device to request the first relay device to provide a measurement service; and the remote device is configured to: send the first message to the relay device, and receive the second message sent by the relay device, where the first remote device in the remote device establishes a connection to the first relay device in the relay device, the first remote device sends the third message to the first relay device after establishing the connection, and the third message is used by the first remote device to request the first relay device to provide the measurement service.

According to a twenty-first aspect, a third communications system is provided, and includes a relay device and a remote device, where the relay device is configured to receive a first message sent by a first remote device in the remote device, where the first message is used by the first remote device to request the relay device to provide a relay service, the relay device sends a second message, the second message is used by the first remote device to discover the relay device, a first relay device in the relay device establishes a connection to the first remote device, the first relay device sends a fourth message after establishing the connection, and the fourth message is used by the first remote device to measure signal strength of a link between the first remote device and the first relay device; and the remote device is configured to: send the first message to the relay device, and receive the second message sent by the relay device, where the first remote device in the remote device establishes a connection to the first relay device in the relay device; after establishing the connection, the first remote device receives the fourth message sent by the first relay device; and the fourth message is used by the first remote device to measure the signal strength of the link between the first remote device and the first relay device.

In this application, after a remote device establishes a connection to a relay device, the relay device may continue to send a message used by the remote device to measure signal strength. Therefore, it can be ensured that the remote device measures signal strength of a link between the remote device and the relay device.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
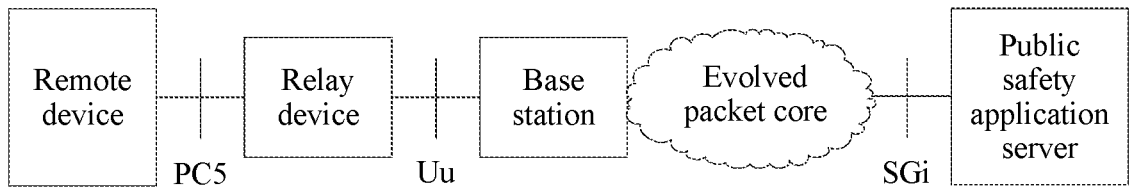
FIG. 1 is a schematic diagram in which a remote device receives, by using a relay device, a network service provided by an E-UTRAN.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The following describes some terms in the present invention to facilitate understanding of a person skilled in the art.

(1) In the embodiments of the present invention, a device that accepts a relay service is referred to as a remote device. The remote device may be a terminal, for example, may be remote UE, or may be another device.

In the embodiments of the present invention, a device that provides the relay service is referred to as a relay device, and may also be a terminal, for example, may be a ProSe UE-to-NW relay, or may be another device.

(2) The terminal is a device that provides voice and/or data connectivity for a user, for example, may include a handheld device with a wireless connection function, or a processing device connected to a wireless modem. The terminal may communicate with a core network by using a residential access network (Residential Access Network, RAN), and exchange voice and/or data with the RAN. The terminal may be referred to as UE, a wireless terminal, a mobile terminal, a subscriber unit (Subscriber Unit), a subscriber station (Subscriber Station), a mobile station (Mobile Station), a mobile (Mobile), a remote station (Remote Station), an access point (Access Point, AP), a remote terminal (Remote Terminal), an access terminal (Access Terminal), a user terminal (User Terminal), a user agent (User Agent), a user device (User Device), or the like. For example, the terminal may be a mobile phone (or referred to as a "cellular" phone), a computer with a mobile terminal, or a portable, pocket-sized, handheld, computer built-in, or in-vehicle mobile apparatus. For example, the terminal may be a device such as a personal communications service (Personal Communication Service, PCS) phone, a cordless telephone set, a Session Initiation Protocol (Session Initiation Protocol, SIP) phone, a wireless local loop (Wireless Local Loop, WLL) station, or a personal digital assistant (Personal Digital Assistant, PDA).

(3) The terms "system" and "network" in the embodiments of the present invention may be used interchangeably. The term "multiple" indicates "two or more". The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects unless specified otherwise.

The following describes examples of method embodiments of the present invention with reference to the accompanying drawings.

I. An embodiment for Model A is first described.

Figure 2:
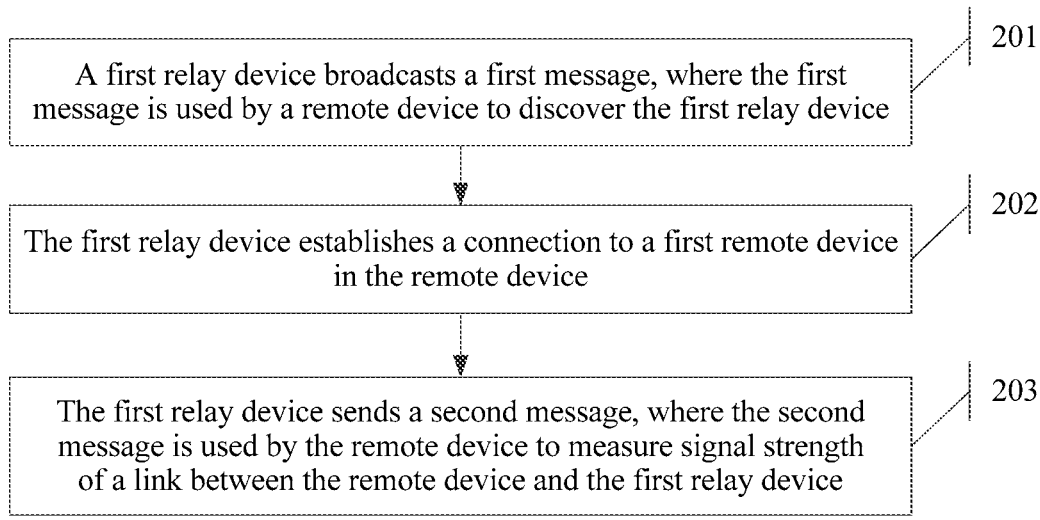
FIG. 2 is a first flowchart of a signal strength measurement method according to an embodiment of the present invention.

Referring to FIG. 2, an embodiment of the present invention provides a first signal strength measurement method. A procedure of the method is described as follows:

Step 201: A first relay device broadcasts a first message, where the first message is used by a remote device to discover the first relay device.

Step 202: The first relay device establishes a connection to a first remote device in the remote device.

Step 203: The first relay device sends a second message, where the second message is used by the remote device to measure signal strength of a link between the remote device and the first relay device.

Figure 3:
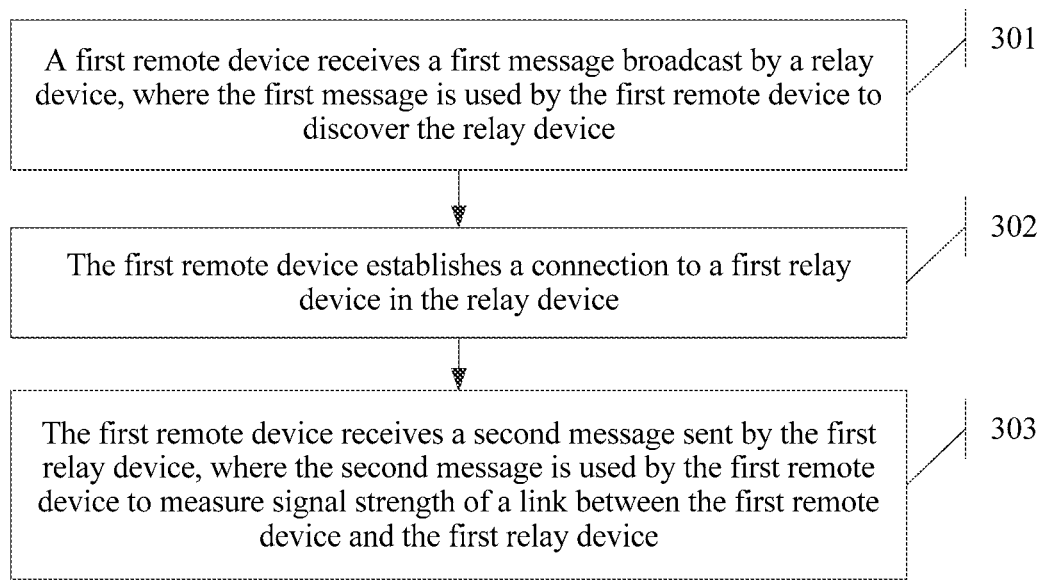
FIG. 3 is a second flowchart of a signal strength measurement method according to an embodiment of the present invention.

Referring to FIG. 3, an embodiment of the present invention provides a second signal strength measurement method. The method is a method corresponding to the first signal strength measurement method shown in FIG. 2. A procedure of the method is described as follows:

Step 301: A first remote device receives a first message broadcast by a relay device, where the first message is used by the first remote device to discover the relay device.

Step 302: The first remote device establishes a connection to a first relay device in the relay device.

Step 303: The first remote device receives a second message sent by the first relay device, where the second message is used by the first remote device to measure signal strength of a link between the first remote device and the first relay device.

Because the methods shown in FIG. 2 and FIG. 3 are corresponding methods, the following describes the methods together.

In actual application, multiple relay devices and multiple remote devices are included. Each relay device may establish connections to multiple remote devices. Methods are similar. In the embodiments of the present invention, one remote device (for example, referred to as a first remote device) is used as an example for description.

For Model A in a D2D technology, before a first relay device has not established a connection to any remote device, the first relay device may broadcast a first message (for example, the first message may be the announcement message described above), so that after receiving the first message, a remote device may select the relay device and establish a connection. If there are multiple relay devices, all the multiple relay devices may be able to broadcast first messages, and each remote device may receive the first messages broadcast by the multiple relay devices. Therefore, a remote device may select one relay device from the multiple relay devices and perform access. For example, the first remote device chooses to access the first relay device.

After establishing a connection to the first remote device, the first relay device may start to send a second message, that is, the first relay device can start to send the second message provided that a remote device establishes a connection to the first relay device. If no remote device is connected to the first relay device, the first relay device may stop sending the second message, so as to save transmission resources. After receiving the second message, the remote device (for example, the first remote device) connected to the first relay device may measure signal strength of a link (for example, a PC5 link) between the remote device and the first relay device according to the second message, so that the remote device may determine whether to continue accessing the first relay device or to re-access another relay device.

Optionally, the second message is the same as the first message, and the first message and the second message each carry an indication (for convenient description, the indication is referred to as a first indication) whether the first relay device reaches an upper access limit. The first message and the second message are used by the remote device to discover the first relay device and to measure the signal strength of the link between the remote device and the first relay device.

For example, if the first message is an announcement message, the second message may also be an announcement message.

If the first relay device sends the second message in a broadcast manner, in addition to a remote device that has accessed the first relay device, a remote device that has not accessed the first relay device may receive the second message. There is always an upper limit to a quantity of remote devices to which a relay device can be connected. When a quantity of remote devices connected to the first relay device reaches the upper limit, if the relay device further continues to send the announcement message, that is, continues to send the second message, for remote devices that have not accessed the first relay device, if there is no indication in the second message, the remote devices may consider that the first relay device can continue providing a relay service, and therefore, the remote devices may continue to request to access the first relay device. Obviously, the remote devices cannot complete access after sending requests to the first relay device, that is, the other remote devices that have not accessed the first relay device and the first relay device all do unnecessary work, and power consumption is relatively large. Because the first message is the same as the second message in the embodiments, a problem of the first message is the same as that of the second message. For example, it may be understood that the first relay device sends one type of message throughout. The message may be referred to as the first message, or may be referred to as the second message.

To resolve the problem, in the embodiments of the present invention, the first message or the second message may further carry the first indication. The first indication is used to indicate whether the first relay device can provide a relay service for another remote device, that is, whether the first relay device reaches the upper access limit.

Optionally, the indication whether the first relay device reaches the upper access limit is specifically used to indicate:

the first relay device cannot provide a relay service for the remote device when the first relay device reaches the upper access limit; or the first relay device can provide a relay service for the remote device when the first relay device does not reach the upper access limit.

That is, when the first relay device may further provide the relay service for another remote device, the first indication in the first message and/or the second message that are/is sent by the first relay device may be used to indicate that the first relay device can provide the relay service. After the first relay device cannot provide the relay service for another remote device, the first indication in the first message and/or the second message that are/is sent by the first relay device may be used to indicate that the first relay device cannot provide the relay service for the remote device. Therefore, if the first relay device broadcasts the first message or the second message, after receiving the first message, a remote device that has not accessed the first relay device may know, according to the first indication, whether the first relay device can be further accessed, so as to prevent the remote device from doing unnecessary work, reduce device power consumption, reduce information interaction processes, and save transmission resources.

Optionally, the first indication may be implemented by setting a flag bit in a relay service codeword (Relay Service Code) carried in the announcement message, for example, may be indicated by using one bit such as a most significant bit or a least significant bit in the relay service code. For example, if a value of the bit is "0", it indicates that the first relay device cannot be accessed by a remote device. If a value of the bit is "1", it indicates that the first relay device can be accessed by a remote device.

Optionally, a separate information element (Information element, IE) may be used as the first indication. For example, a relay overload indicator (Relay Overload Indicator) may be added to the announcement message, and a function of the first indication is completed by using the relay overload indicator. For example, a type of the relay overload indicator is a Boolean (Boolean) type. If a value of the relay overload indicator is "false", it indicates that the first relay device cannot be accessed by a remote device. If a value of the relay overload indicator is "true", it indicates that the first relay device can be accessed by a remote device.

Optionally, after the first relay device establishes the connection to the first remote device, if the first relay device can provide a relay service for the remote device, the first relay device sends the second message when sending the first message, where the second message carries an identifier of the first relay device; or the first relay device sends the second message if the first relay device can provide a relay service for the remote device, where the second message is the same as the first message, and the first message or the second message is used by the remote device to discover the first relay device and to measure the signal strength of the link between the remote device and the first relay device; or when the first relay device cannot provide a relay service for the remote device, the first relay device stops sending the second message, and starts to send a third message, where the third message carries an identifier of the first relay device; or when the first relay device cannot provide a relay service for the remote device, the first relay device stops sending the first message, and starts to send the second message, where the second message carries an identifier of the first relay device.

Optionally, after the first remote device establishes the connection to the first relay device, if the first relay device can provide a relay service for the remote device, the first remote device monitors and receives the first message or the second message, where the first message and the second message each carry an identifier of the first relay device; or if the first relay device can provide a relay service for the remote device, the first remote device monitors and receives the second message, where the second message is the same as the first message, and the first message or the second message is used by the first remote device to discover the first relay device and to measure the signal strength of the link between the first remote device and the first relay device; or when the first relay device cannot provide a relay service for the remote device, the first remote device stops monitoring the second message, and starts to monitor a third message, where the third message carries an identifier of the first relay device; or the first remote device monitors the second message if the first relay device cannot provide a relay service for the remote device, where the second message carries an identifier of the first relay device.

That is, before establishing the connection to the remote device, the first relay device broadcasts the first message. After the connection to the remote device is established, there are two message sending manners.

1. Before reaching the upper access limit, the first relay device continues broadcasting the first message and simultaneously sends the second message. Therefore, the first remote device that has accessed the first relay device may monitor and receive the first message or the second message. After reaching the upper access limit, the first relay device may stop broadcasting the first message and send only the second message. Therefore, when the first remote device cannot monitor the first message, the first remote device may monitor and receive only the second message. That is, in this manner, the relay device may simultaneously broadcast the first message and the second message. In this way, a remote device that has not accessed the first relay device may choose, according to the first message, to access the relay device, and a remote device that has accessed the first relay device may measure signal strength according to the first message or the second message. Therefore, requirements of different remote devices can be met.

The second message may carry the identifier of the first relay device, so that the remote device (for example, the first remote device) that has accessed the first relay device may monitor the second message according to the identifier of the first relay device.

Optionally, the second message may be a message used to measure signal strength. For example, the second message may be an announcement message, or may be another message, for example, may be a reference message (Reference message). Regardless of a specific type of the second message, the second message may carry the identifier of the first relay device. If the second message is the announcement message, because generally, the announcement message originally carries the identifier of the first relay device, another identifier of the first relay device does not need to be further added to the announcement message in this case. If the second message is the another message such as the reference message, at least one of the identifier of the first relay device or a first codeword may be added to the second message.

2. After establishing the connection to the first remote device, the first relay device stops sending the first message. Before reaching the upper access limit, the first relay device sends the second message. In this case, the second message and the first message are the same, for example, both may be announcement messages. Both the first remote device that has accessed the first relay device and a remote device that has not accessed the first relay device may monitor and receive the second message. After reaching the upper access limit, the relay device may stop sending the second message, and start to send the third message; and the first remote device may monitor and receive the third message. That is, in this manner, after establishing the connection to the first remote device, the first relay device may first send the second message, and then send the third message after reaching the upper access limit. In this way, the first relay device needs to send only one type of message each time, so that load on the relay device is relatively light.

The third message carries the identifier of the first relay device, and the first remote device may monitor and receive the third message according to the identifier of the first relay device.

Optionally, the third message may be a message used to measure signal strength. For example, the third message may be an announcement message, or may be another message, for example, may be a reference message. Regardless of a specific type of the third message, the third message may carry the identifier of the first relay device. If the third message is the announcement message, because generally, the announcement message originally carries the identifier of the first relay device, another identifier of the first relay device does not need to be further added to the announcement message in this case. If the third message is the another message such as the reference message, at least one of the identifier of the first relay device or a first codeword may be added to the third message.

Optionally, the identifier of the first relay device is used by the first remote device to identify the first message, the second message, or the third message that is sent by the first relay device.

The identifier of the first relay device includes at least one of a first codeword used to identify the first relay device or the identifier of the first relay device.

A manner of identifying a message sent by the first relay device includes but is not limited to filtering (filter).

Optionally, provided that the first codeword can be used to indicate an identity of the first relay device, the first codeword may be a relay reference codeword (Relay Reference Code), or certainly, may be another codeword.

Optionally, provided that the identifier of the first relay device can be used to uniquely identify the first relay device, the identifier of the first relay device may be, for example, a proximity-based service user equipment identification number (ProSe UE ID) of the first relay device, or may be another possible identifier of the first relay device. The identifier of the first relay device may be the identifier that the first relay device originally has; or may be an identifier allocated by the first relay device to the first relay device after establishing the connection to the first remote device, and may be used to identify the identity of the first relay device in a process of communicating with the remote device to which the connection is established.

Optionally, that the first relay device sends a second message includes:

broadcasting, by the first relay device, the second message; or sending, by the first relay device, the second message to the remote device in a unicast or multicast manner.

That is, a manner in which the first relay device sends the second message is not limited in the embodiments of the present invention.

II. The foregoing describes the embodiment for Model A, and the following describes an embodiment for Model B.

Figure 4:
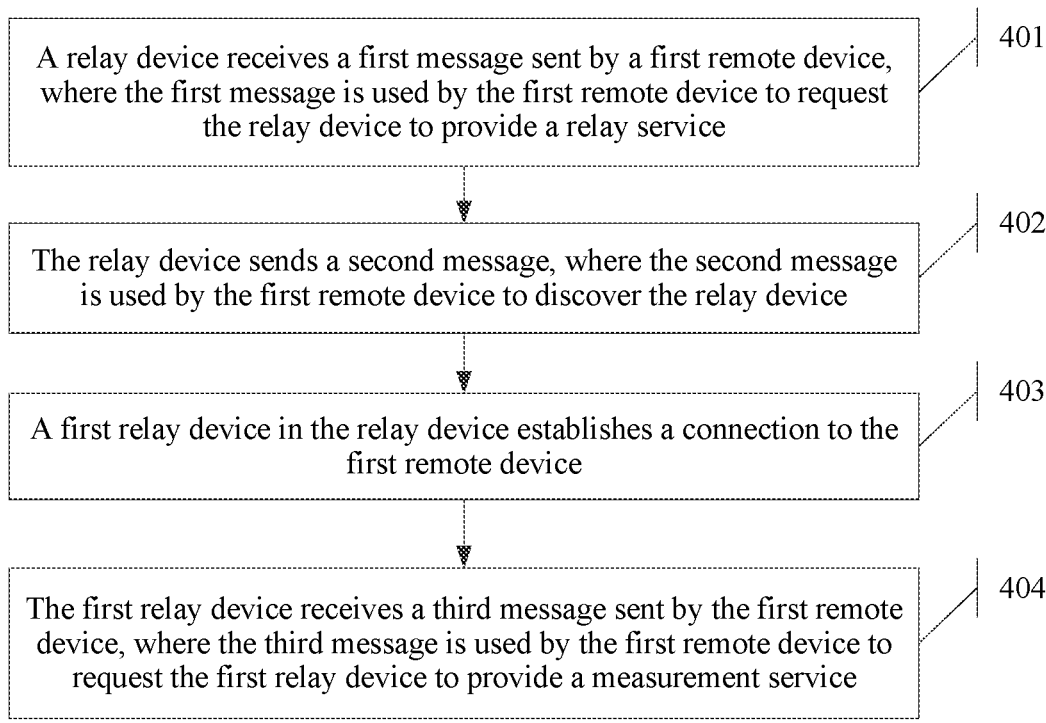
FIG. 4 is a third flowchart of a signal strength measurement method according to an embodiment of the present invention.

Referring to FIG. 4, based on a same invention concept, an embodiment of the present invention provides a third signal strength measurement method. A procedure of the method is described as follows:

Step 401: A relay device receives a first message sent by a first remote device, where the first message is used by the first remote device to request the relay device to provide a relay service.

Step 402: The relay device sends a second message, where the second message is used by the first remote device to discover the relay device.

Step 403: A first relay device in the relay device establishes a connection to the first remote device.

Step 404: The first relay device receives a third message sent by the first remote device, where the third message is used by the first remote device to request the first relay device to provide a measurement service.

Figure 5:
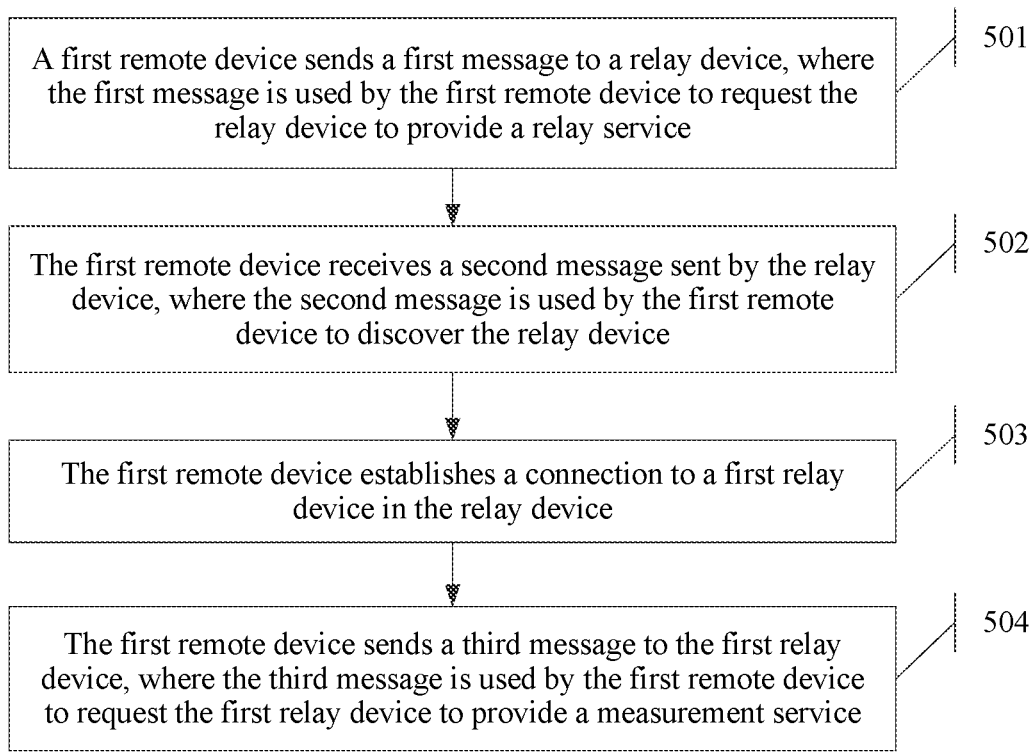
FIG. 5 is a fourth flowchart of a signal strength measurement method according to an embodiment of the present invention.

Referring to FIG. 5, based on a same invention concept, an embodiment of the present invention provides a fourth signal strength measurement method. A procedure of the method is described as follows:

Step 501: A first remote device sends a first message to a relay device, where the first message is used by the first remote device to request the relay device to provide a relay service.

Step 502: The first remote device receives a second message sent by the relay device, where the second message is used by the first remote device to discover the relay device.

Step 503: The first remote device establishes a connection to a first relay device in the relay device.

Step 504: The first remote device sends a third message to the first relay device, where the third message is used by the first remote device to request the first relay device to provide a measurement service.

Because the methods shown in FIG. 4 and FIG. 5 are corresponding methods, the following describes the methods together.

In Model B, when a first remote device accesses no relay device, if the first remote device needs to perform access, the first remote device may send a first message, for example, may send the first message in a broadcast manner, to request a relay device to provide a relay service. For example, the first message may be the solicitation request described above. Therefore, since the first message is sent in the broadcast manner, multiple relay devices may receive the first message, so that a relay device that can provide a service required by the first remote device may broadcast a second message to the remote device. For example, the second message may be the response message described above. If all the multiple relay devices broadcast response messages, the first remote device may select one relay device for access from the multiple relay devices according to the received response messages. For example, the first remote device selects a first relay device.

In Model B, when the first remote device needs to measure signal strength of a link between the first remote device and the first relay device (for example, when the first remote device may receive triggering of a user, or when the first remote device may perform periodical measurement) after establishing a connection to the first relay device, the first remote device may send a third message to the first relay device. The third message is used to request the first relay device to provide a measurement service.

Optionally, provided that the third message is used to request the first relay device to provide the measurement service, the third message may be, for example, a solicitation request, or may be another message.

Optionally, that the first remote device sends a third message to the first relay device further includes:

if the third message carries an identifier of the first relay device, determining, by the first remote device, to receive a fourth message sent by the first relay device, where the fourth message is used by the first remote device to measure signal strength of a link between the first remote device and the first relay device.

Optionally, that the first relay device receives a third message sent by the first remote device further includes:

if the third message carries an identifier of the first relay device, determining, by the first relay device, that the first relay device is to send a fourth message to the first remote device, where the fourth message is used by the first remote device to measure signal strength of a link between the first remote device and the first relay device.

Because the first remote device wants to request a measurement service provided by a relay device (that is, the first relay device) connected to the first remote device, and because the first remote device sends the third message in a broadcast manner, multiple relay devices may be able to receive the third message. If all the relay devices that receive the third message reply with fourth messages, load on the first remote device and that on another relay device are increased, and transmission resources are relatively wasted. Therefore, in the embodiments of the present invention, the third message may carry the identifier of the first relay device, so that a relay device that receives the third message may first determine the identifier of the relay device that is carried in the third message. If the identifier of the relay device that is carried in the third message is not an identifier of the relay device, the relay device may not respond to the third message, for example, may discard the third message, so as to avoid causing interference for the first remote device and save transmission resources.

Optionally, after the first relay device receives the third message sent by the first remote device, the method further includes:

if the third message carries an identifier for requesting the measurement service, determining, by the first relay device, that the third message is sent by the first remote device, and sending, by the first relay device, a fourth message to the first remote device, where the fourth message is used by the first remote device to measure signal strength of a link between the first remote device and the first relay device.

Optionally, after the first remote device sends the third message to the first relay device, the method further includes:

if the third message carries an identifier for requesting the measurement service, receiving, by the first remote device, a fourth message sent by the first relay device, where the fourth message is used by the first remote device to measure signal strength of a link between the first remote device and the first relay device.

Because the first remote device wants to request a measurement service provided by a relay device (that is, the first relay device) connected to the first remote device, and because the first remote device sends the third message in a broadcast manner, multiple relay devices may be able to receive the third message. If all the relay devices that receive the third message reply with fourth messages, load on the first remote device and that on another relay device are increased, and transmission resources are relatively wasted. Therefore, in the embodiments of the present invention, the third message may carry the identifier for requesting the measurement service, so that a relay device that receives the third message may first determine the identifier carried in the third message. If the identifier carried in the third message is the identifier for requesting the measurement service, the relay device that is not connected to the first remote device may not respond to the third message, for example, may discard the third message, so as to avoid causing interference for the first remote device and save transmission resources.

In addition, because the third message is used to request to provide the measurement service, the third message may carry the identifier for requesting the measurement service. In this way, after receiving the third message, the first relay device may also determine how to respond to the third message.

If after receiving the third message, the first relay device determines that the third message carries the identifier for requesting the measurement service, the first relay device determines that a sender of the third message is the first remote device, so that the first relay device may send the fourth message to the first remote device. The fourth message may be used by the first remote device to measure the signal strength of the link between the first remote device and the first relay device.

Optionally, the fourth message may be a message used by a remote device to measure signal strength. For example, the fourth message may be a response message, or may be another message, for example, may be a reference message.

Optionally, the fourth message carries the identifier of the first relay device. The identifier of the first relay device includes at least one of a first codeword used to identify the first relay device or the identifier of the first relay device.

The first codeword and the identifier of the first relay device are described above, and are not described again.

According to the technical solutions provided in FIG. 4 and FIG. 5, if a first remote device needs to measure signal strength of a link between the first remote device and a first relay device after establishing a connection to the first relay device, the first remote device may send a third message to the first relay device. After receiving the third message, the first relay device may reply with a fourth message, so that the first remote device may perform measurement. Therefore, a technical problem that a remote device cannot measure signal strength of a link after establishing a connection to a relay device is resolved, and the remote device uses the link more autonomously.

Figure 6:
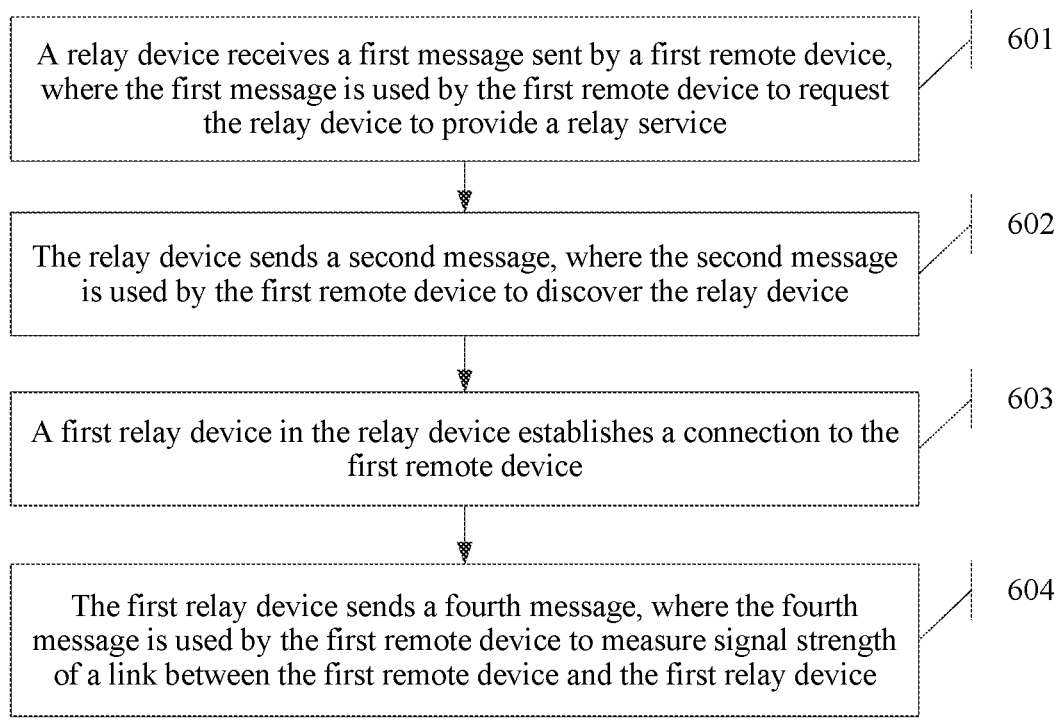
FIG. 6 is a fifth flowchart of a signal strength measurement method according to an embodiment of the present invention.

Referring to FIG. 6, based on a same invention concept, an embodiment of the present invention provides a fifth signal strength measurement method. A procedure of the method is described as follows:

Step 601: A relay device receives a first message sent by a first remote device, where the first message is used by the first remote device to request the relay device to provide a relay service.

Step 602: The relay device sends a second message, where the second message is used by the first remote device to discover the relay device.

Step 603: A first relay device in the relay device establishes a connection to the first remote device.

Step 604: The first relay device sends a fourth message, where the fourth message is used by the first remote device to measure signal strength of a link between the first remote device and the first relay device.

Figure 7:
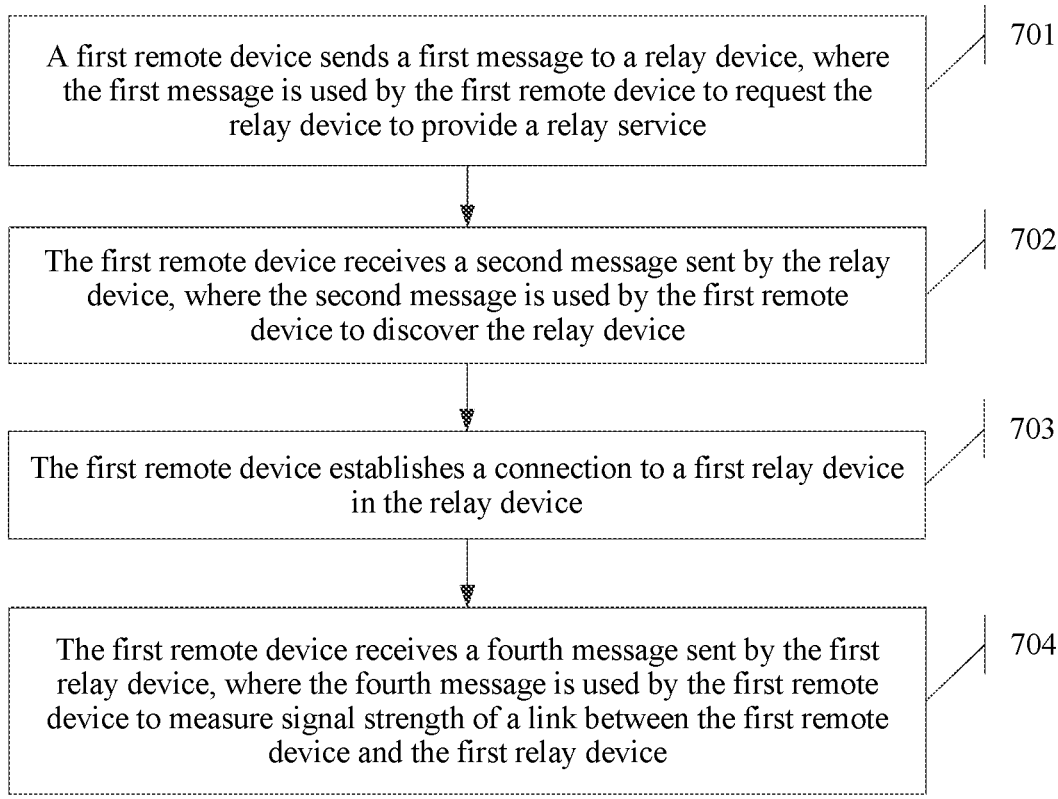
FIG. 7 is a sixth flowchart of a signal strength measurement method according to an embodiment of the present invention.

Referring to FIG. 7, based on a same invention concept, an embodiment of the present invention provides a sixth signal strength measurement method. A procedure of the method is described as follows:

Step 701: A first remote device sends a first message to a relay device, where the first message is used by the first remote device to request the relay device to provide a relay service.

Step 702: The first remote device receives a second message sent by the relay device, where the second message is used by the first remote device to discover the relay device.

Step 703: The first remote device establishes a connection to a first relay device in the relay device.

Step 704: The first remote device receives a fourth message sent by the first relay device, where the fourth message is used by the first remote device to measure signal strength of a link between the first remote device and the first relay device.

Because the methods shown in FIG. 6 and FIG. 7 are corresponding methods, the following describes the methods together.

A difference between the methods in FIG. 6 and FIG. 7 and the methods in FIG. 4 and FIG. 5 is as follows: After a first remote device establishes a connection to a first relay device, the first remote device does not need to send a third message, but the first relay device actively sends a fourth message, so that the first remote device may receive the fourth message, and the fourth message may be used by the first remote device to measure signal strength of a link between the first remote device and the first relay device.

Optionally, the fourth message may be a message used by a remote device to measure signal strength. For example, the fourth message may be a response message, or may be another message, for example, may be a reference message.

Optionally, the fourth message carries an identifier of the first relay device. The identifier of the first relay device includes at least one of a first codeword used to identify the first relay device or the identifier of the first relay device.

The first codeword and the identifier of the first relay device are described above, and are not described again.

According to the technical solutions provided in FIG. 6 and FIG. 7, after a first remote device establishes a connection to a first relay device, the first relay device may actively send a fourth message, so that the first remote device may perform measurement without doing more work. Therefore, load on the remote device is reduced, a technical problem that a remote device cannot measure signal strength of a link after establishing a connection to a relay device is resolved, and the remote device uses the link more autonomously.

The following describes, by using several examples, the signal strength measurement method provided in the embodiments of the present invention. When the examples are used, Model A and Model B are separately used as examples.

I. Model A

Example 1

Figure 8:
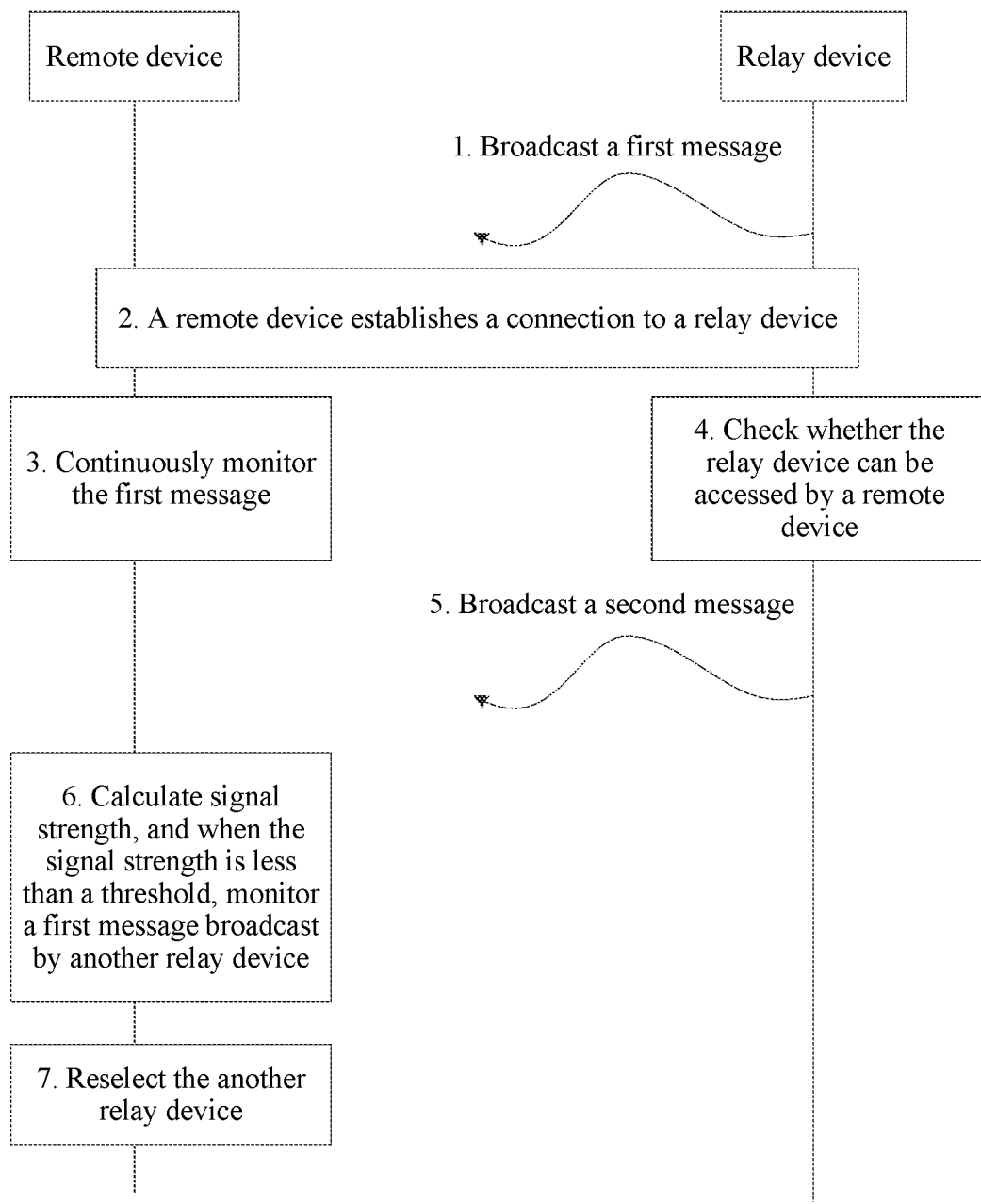
FIG. 8 is a flowchart of a first example of a signal strength measurement method according to an embodiment of the present invention.

Refer to FIG. 8.

1. A ProSe UE-to-NW relay broadcasts an announcement message, where the announcement message carries a first indication whether the ProSe UE-to-NW relay can be accessed by remote UE, that is, the announcement message is a first message.

2. After receiving the announcement message, remote UE establishes a connection to the ProSe UE-to-NW relay.

3. The remote UE continuously monitors the announcement message sent by the ProSe UE-to-NW relay that currently provides a relay service, where the announcement message in this case is a second message, that is, the first message is the same as the second message in Example 1.

The remote UE may determine a sender of the announcement message by using a ProSe UE ID carried in the announcement message, or may determine a sender of the announcement message with reference to a relay service code and a ProSe UE ID that are carried in the announcement message.

4. The ProSe UE-to-NW relay checks whether the ProSe UE-to-NW relay can be accessed by another remote UE; and if the ProSe UE-to-NW relay cannot be accessed by another remote UE, the ProSe UE-to-NW relay indicates, by using the first indication carried in the second message, that the ProSe UE-to-NW relay cannot be accessed by remote UE.

There is no sequence relationship between step 3 and step 4.

5. The ProSe UE-to-NW relay continuously broadcasts the announcement message.

6. The remote UE calculates received signal strength by using the received announcement message, that is, calculates signal strength of a link between the remote UE and the ProSe UE-to-NW relay.

For example, if the calculated signal strength is less than a threshold, the remote UE may start to monitor an announcement message sent by another ProSe UE-to-NW relay, so as to determine whether to access the another ProSe UE-to-NW relay.

The threshold may be preset in a system, may be specified in a protocol, may be self-set by a device, or may be set by a user.

7. The remote UE reselects another ProSe UE-to-NW relay to establish a connection.

For example, the remote UE determines, by means of measurement, that the another ProSe UE-to-NW relay can provide better signal strength. For example, the signal strength provided by the another ProSe UE-to-NW relay is better than the signal strength provided by the currently-accessed ProSe UE-to-NW relay, or the signal strength provided by the another ProSe UE-to-NW relay is greater than the threshold. Therefore, the remote UE may request to be disconnected from the currently-accessed ProSe UE-to-NW relay, and re-access the another ProSe UE-to-NW relay.

In this way, after establishing the connection to the ProSe UE-to-NW relay, the remote UE may further continue to measure the signal strength of the link between the remote UE and the ProSe UE-to-NW relay, so that the remote UE may choose whether to re-access the another ProSe UE-to-NW relay, so as to ensure, as much as possible, that the remote UE can obtain better network service quality.

In Example 1, a ProSe UE-to-NW relay broadcasts only one type of message (which may be referred to as a first message, or may be referred to as a second message) throughout, and adds a first indication to the broadcast message. Therefore, the ProSe UE-to-NW relay does not need to broadcast two different messages, so as to save transmission resources, and reduce load on the ProSe UE-to-NW relay.

Example 2

Figure 9:
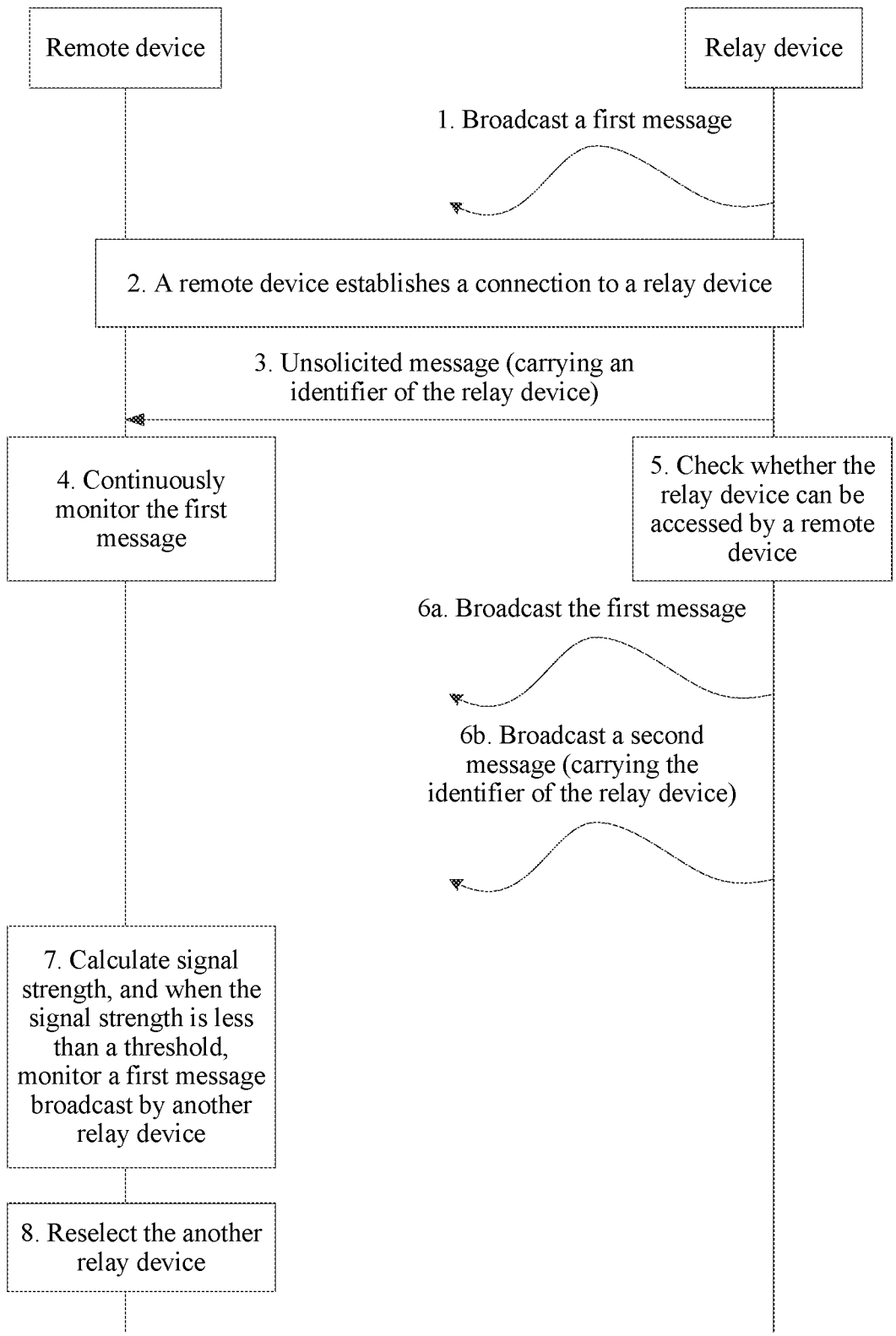
FIG. 9 is a flowchart of a second example of a signal strength measurement method according to an embodiment of the present invention.

Refer to FIG. 9.

1. A ProSe UE-to-NW relay broadcasts an announcement message that carries a relay service code, that is, a first message.

2. After receiving the announcement message, remote UE establishes a connection to the ProSe UE-to-NW relay.

3. The ProSe UE-to-NW relay sends an unsolicited message (Unsolicited message) to the remote UE, where the unsolicited message carries a relay reference code or a ProSe UE ID, that is, the unsolicited message is used to notify the remote UE of the relay reference code or the ProSe UE ID.

The ProSe UE ID may be an identifier that is allocated by the ProSe UE-to-NW relay to the ProSe UE-to-NW relay after establishing the connection to the remote UE, and may be used to identify the ProSe UE-to-NW relay in a second message. In this case, all remote UEs served by the ProSe UE-to-NW relay may perform measurement provided that the ProSe UE-to-NW relay sends only one second message. Alternatively, a ProSe UE ID in the first message may be directly used as the ProSe UE ID that is in the second message and that is used to identify the ProSe UE-to-NW relay. In this case, the ProSe UE ID is obtained by the remote device from the first message without being sent to the remote device by using the step. However, because ProSe UE IDs in first messages may be different, the ProSe UE-to-NW relay needs to send multiple second messages for measurement performed by all the remote UEs served by the ProSe UE-to-NW relay, or needs to include all possible ProSe UE IDs into one second message.

The relay reference code may be preconfigured in the ProSe UE-to-NW relay.

4. The remote UE continues to monitor the announcement message that carries the relay service code and that is broadcast by the ProSe UE-to-NW relay that currently provides a relay service, that is, the first message (that is, the remote UE may monitor the announcement message by using the relay service code), where when obtaining no first message by means of monitoring, the remote UE may start to monitor, by using the ProSe UE ID or the relay reference code that is received in step 3, a message that is specially used to measure a signal and that is sent by the ProSe UE-to-NW relay, that is, a second message.

That is, in Example 2, the ProSe UE-to-NW relay may send the two types of messages. When the ProSe UE-to-NW relay can be accessed by remote UE, the ProSe UE-to-NW relay may send the first message. When the ProSe UE-to-NW relay cannot be accessed by remote UE, the ProSe UE-to-NW relay may stop sending the first message, and start to send the second message.

Alternatively, step 4 may be that the remote UE continues to monitor the announcement message that carries the relay service code and that is broadcast by the ProSe UE-to-NW relay that currently provides a relay service, and the message that carries the ProSe UE ID or the relay reference code, that is, may simultaneously monitor the first message and a second message.

That is, in Example 2, the ProSe UE-to-NW relay may send the two types of messages. When the ProSe UE-to-NW can be accessed by remote UE, the ProSe UE-to-NW relay may simultaneously send the first message and the second message.

5. The ProSe UE-to-NW relay checks whether the ProSe UE-to-NW relay can be accessed by another remote UE.

If the ProSe UE-to-NW relay cannot be accessed by another remote UE, the ProSe UE-to-NW relay may stop broadcasting the first message, and broadcast only the second message. The second message carries the ProSe UE ID or the relay reference code that is described in step 3.

There is no sequence relationship between step 4 and step 5.

6a. The ProSe UE-to-NW relay broadcasts the announcement message that carries the relay service code, that is, broadcasts the first message.

6b. The ProSe UE-to-NW relay broadcasts the second message.

Steps 6a and 6b are detailed description of step 5.

7. The remote UE calculates received signal strength by using the received second message, that is, calculates signal strength of a link between the remote UE and the ProSe UE-to-NW relay.

For example, if the calculated signal strength is less than a threshold, the remote UE may start to monitor an announcement message sent by another ProSe UE-to-NW relay, so as to determine whether to access the another ProSe UE-to-NW relay.

The threshold may be preset in a system, may be specified in a protocol, may be self-set by a device, or may be set by a user.

8. The remote UE reselects another ProSe UE-to-NW relay to establish a connection.

For example, the remote UE determines, by means of measurement, that the another ProSe UE-to-NW relay can provide better signal strength. For example, the signal strength provided by the another ProSe UE-to-NW relay is better than the signal strength provided by the currently-accessed ProSe UE-to-NW relay, or the signal strength provided by the another ProSe UE-to-NW relay is greater than the threshold. Therefore, the remote UE may re-choose to access the another ProSe UE-to-NW relay.

In this way, after establishing the connection to the ProSe UE-to-NW relay, the remote UE may further continue to measure the signal strength of the link between the remote UE and the ProSe UE-to-NW relay, so that the remote UE may choose whether to re-access the another ProSe UE-to-NW relay, so as to ensure, as much as possible, that the remote UE can obtain better network service quality.

In Example 2, a ProSe UE-to-NW relay may first broadcast a first message and then broadcast a second message. If remote UE receives the first message, it indicates that the ProSe UE-to-NW relay may be further accessed by another remote UE. Therefore, remote UE that has not accessed the ProSe UE-to-NW relay may choose whether to access the ProSe UE-to-NW relay, and remote UE that has accessed the ProSe UE-to-NW relay may measure signal strength by using the first message. If remote UE receives the second message, it indicates that the ProSe UE-to-NW relay may be unable to be accessed by another remote UE. Therefore, remote UE that has not accessed the ProSe UE-to-NW relay no longer selects the ProSe UE-to-NW relay for access, and remote UE that has accessed the ProSe UE-to-NW relay may continue to measure signal strength by using the second message.

Alternatively, in Example 2, a ProSe UE-to-NW relay may simultaneously broadcast a first message and a second message. If remote UE may receive the first message, it indicates that the ProSe UE-to-NW relay may be further accessed by another remote UE. Therefore, remote UE that has not accessed the ProSe UE-to-NW relay may choose whether to access the ProSe UE-to-NW relay, and remote UE that has accessed the ProSe UE-to-NW relay may measure signal strength by using the second message. If remote UE can receive only the second message and cannot receive the first message anymore, it indicates that the ProSe UE-to-NW relay may be unable to be accessed by another remote UE. Therefore, remote UE that has not accessed the ProSe UE-to-NW relay no longer selects the ProSe UE-to-NW relay for access, and remote UE that has accessed the ProSe UE-to-NW relay may continue to measure signal strength by using the second message.

In this way, by using the two different messages, not only a signal measurement requirement of the remote UE that has accessed the ProSe UE-to-NW relay can be met, but also an indication whether another remote UE can access the ProSe UE-to-NW relay can be given.

Example 3

Figure 10:
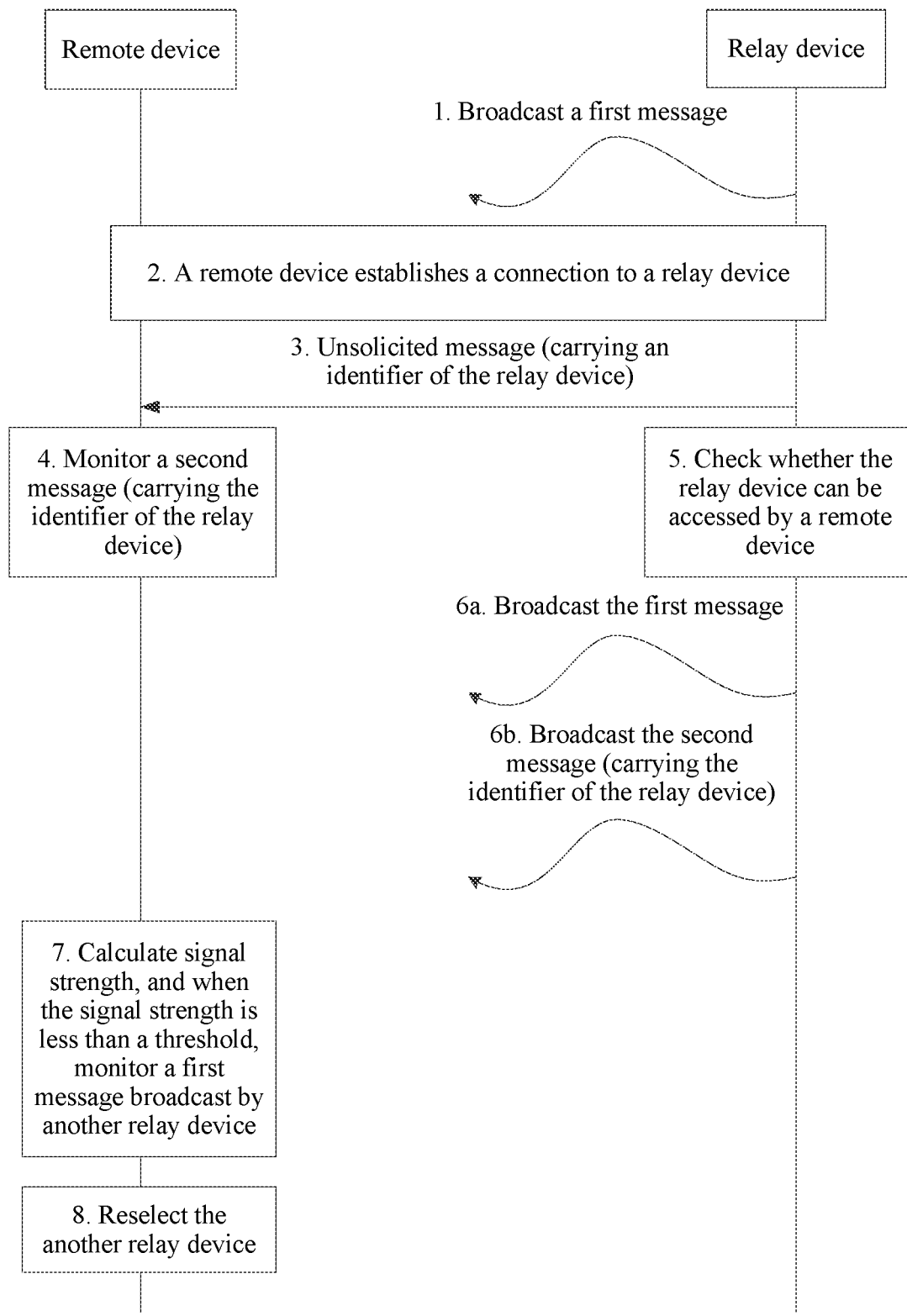
FIG. 10 is a flowchart of a third example of a signal strength measurement method according to an embodiment of the present invention.

Refer to FIG. 10. For step 1 to step 3, step 7, and step 8 in Example 3, refer to Example 2, and details are not repeatedly described. The following describes steps in Example 3 that are different from those in Example 2, that is, description is started from step 4.

4. After receiving the relay reference code, the remote UE starts to monitor the message that carries the relay service code and that is broadcast by the ProSe UE-to-NW relay that currently provides a relay service, that is, starts to monitor a second message.

That is, after receiving the relay reference code, the remote UE no longer monitors the first message.

5. The ProSe UE-to-NW relay checks whether the ProSe UE-to-NW relay can be accessed by another remote UE; and if the ProSe UE-to-NW relay can be accessed by another remote UE, the ProSe UE-to-NW relay simultaneously broadcasts the announcement message that carries the relay service code and the message that carries the relay reference code, that is, simultaneously broadcasts the first message and the second message, that is, simultaneously performs step 6a and step 6b; or if the ProSe UE-to-NW relay can be further accessed by another remote UE, the ProSe UE-to-NW relay may stop broadcasting the announcement message that carries the relay service code, and broadcast only the message that carries the relay reference code, that is, perform only step 6b.

There is no sequence relationship between step 4 and step 5.

6a. The ProSe UE-to-NW relay broadcasts the announcement message that carries the relay service code, that is, broadcasts the first message.

6b. The ProSe UE-to-NW relay broadcasts the second message.

Likewise, steps 6a and 6b are detailed description of step 5.

In Example 3, a ProSe UE-to-NW relay may simultaneously broadcast a second message and a first message, so that remote UE that has accessed the ProSe UE-to-NW relay may monitor only the second message because the remote UE no longer needs to obtain a codeword such as a relay service code, and Remote UE that has not accessed the ProSe UE-to-NW relay may monitor only the first message because the remote UE may not receive a relay reference code or a ProSe UE ID. Therefore, load on remote UE is reduced when requirements of various remote UEs can be met.

Example 4

Figure 11:
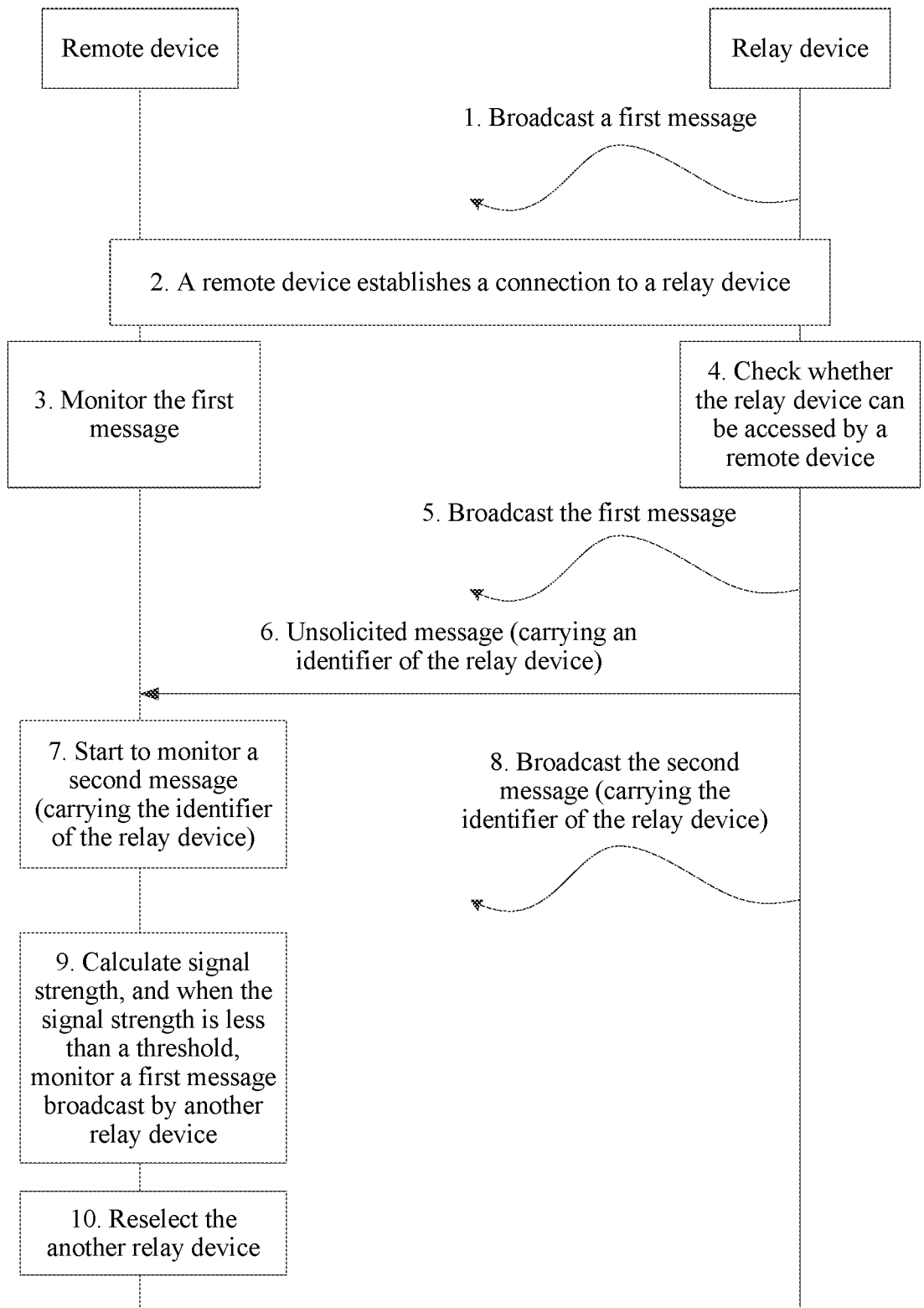
FIG. 11 is a flowchart of a fourth example of a signal strength measurement method according to an embodiment of the present invention.

Refer to FIG. 11.

1. A ProSe UE-to-NW relay broadcasts an announcement message that carries a relay service code, that is, a first message.

2. After receiving the announcement message, remote UE establishes a connection to the ProSe UE-to-NW relay.

3. The remote UE starts to continuously monitor the announcement message broadcast by the ProSe UE-to-NW relay that currently provides a relay service, that is, monitor the first message.

The remote UE may determine a sender of the announcement message by using a ProSe UE ID carried in the message, or may determine a sender of the announcement message with reference to the relay service code and a ProSe UE ID.

4. The ProSe UE-to-NW relay checks whether the ProSe UE-to-NW relay can be accessed by another remote UE; and the ProSe UE-to-NW relay performs step 5 if the ProSe UE-to-NW relay can be accessed by another remote UE, or the ProSe UE-to-NW relay performs steps 6 to 8 if the ProSe UE-to-NW relay cannot continue to be accessed by remote UE.

5. The ProSe UE-to-NW relay continues to broadcast the announcement message that carries the relay service code, that is, the first message.

6. The ProSe UE-to-NW relay sends an unsolicited message to the remote UE, where the unsolicited message carries a relay reference code or a ProSe UE ID, that is, the unsolicited message is used to notify the remote UE of the relay reference code or the ProSe UE ID.

7. After receiving the relay reference code, the remote UE starts to monitor the message that carries the relay reference code, that is, a second message, that is, the remote UE may no longer monitor the first message after receiving the relay reference code.

8. The ProSe UE-to-NW relay starts to broadcast the message that carries the relay reference code.

9. The remote UE calculates received signal strength by using the received second message, that is, calculates signal strength of a link between the remote UE and the ProSe UE-to-NW relay.

For example, if the calculated signal strength is less than a threshold, the remote UE may start to monitor an announcement message sent by another ProSe UE-to-NW relay, so as to determine whether to access the another ProSe UE-to-NW relay.

The threshold may be preset in a system, may be specified in a protocol, may be self-set by a device, or may be set by a user.

10. The remote UE reselects another ProSe UE-to-NW relay to establish a connection.

For example, the remote UE determines, by means of measurement, that the another ProSe UE-to-NW relay can provide better signal strength. For example, the signal strength provided by the another ProSe UE-to-NW relay is better than the signal strength provided by the currently-accessed ProSe UE-to-NW relay, or the signal strength provided by the another ProSe UE-to-NW relay is greater than the threshold. Therefore, the remote UE may request to be disconnected from the currently-accessed ProSe UE-to-NW relay, and re-access the another ProSe UE-to-NW relay.

In this way, after establishing the connection to the ProSe UE-to-NW relay, the remote UE may further continue to measure the signal strength of the link between the remote UE and the ProSe UE-to-NW relay, so that the remote UE may choose whether to re-access the another ProSe UE-to-NW relay, so as to ensure, as much as possible, that the remote UE can obtain better network service quality.

II. Model B

Example 5

Figure 12:
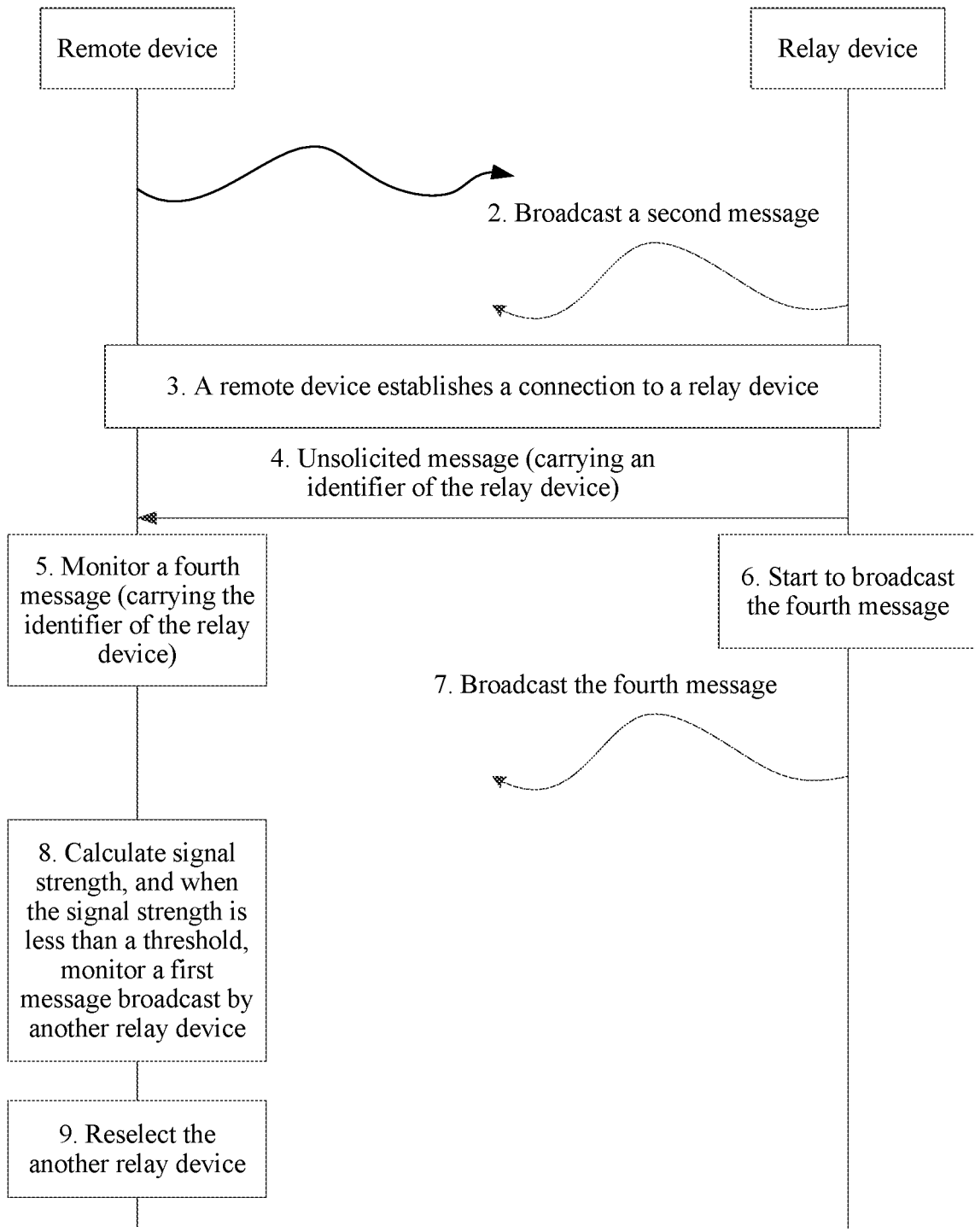
FIG. 12 is a flowchart of a fifth example of a signal strength measurement method according to an embodiment of the present invention.

Refer to FIG. 12.

1. Remote UE broadcasts a solicitation message, that is, broadcasts a first message, where a relay service code carried in the solicitation message indicates a service required by the remote UE.

2. A ProSe UE-to-NW relay that matches the relay service code sends a response message to the remote UE, that is, sends a second message.

3. The remote UE chooses to establish a connection to the ProSe UE-to-NW relay.

4. The ProSe UE-to-NW relay sends an unsolicited message to the remote UE that establishes the connection, where the unsolicited message carries a relay reference code or a ProSe UE ID.

5. The remote UE starts to continuously monitor a fourth message broadcast by the ProSe UE-to-NW relay that currently provides a relay service, and the remote UE may determine, by using the relay reference code or the ProSe UE ID that is carried in the fourth message, that the fourth message is broadcast by the ProSe UE-to-NW relay that currently provides the relay service.

For example, the fourth message may be a response message, or may be another message.

6. After being connected to the remote UE, the ProSe UE-to-NW relay starts to continuously broadcast the fourth message, where the fourth message carries the ProSe UE ID or the relay reference code that is described in step 4.

There is no sequence relationship between step 5 and step 6.

7. The ProSe UE-to-NW relay continuously broadcasts the fourth message.

Step 7 is further description of step 6.

8. The remote UE calculates received signal strength by using the received fourth message, that is, calculates signal strength of a link between the remote UE and the ProSe UE-to-NW relay.

For example, if the calculated signal strength is less than a threshold, the remote UE may broadcast the solicitation message again to determine whether the remote UE can access another ProSe UE-to-NW relay.

The threshold may be preset in a system, may be specified in a protocol, may be self-set by a device, or may be set by a user.

9. The remote UE reselects another ProSe UE-to-NW relay to establish a connection.

For example, the remote UE determines, by means of measurement, that the another ProSe UE-to-NW relay can provide better signal strength. For example, the signal strength provided by the another ProSe UE-to-NW relay is better than the signal strength provided by the currently-accessed ProSe UE-to-NW relay, or the signal strength provided by the another ProSe UE-to-NW relay is greater than the threshold. Therefore, the remote UE may re-choose to access the another ProSe UE-to-NW relay.

In Example 5, after remote UE establishes a connection to a ProSe UE-to-NW relay, the ProSe UE-to-NW relay may continue to broadcast a fourth message, so that the remote UE may measure signal strength of a link between the remote UE and the ProSe UE-to-NW relay. Therefore, it can be determined whether to re-access another ProSe UE-to-NW relay, so as to ensure that the remote UE can obtain better network service quality.

Example 6

Most steps in Example 6 are similar to those in Example 5. Similarities are not described again, and an additional drawing is not provided. The following describes a difference between the two examples.

A step is added between step 4 and step 5, for example, is referred to as step 4a: The remote UE sends a third message to the ProSe UE-to-NW relay, where the third message is used to request the ProSe UE-to-NW relay to provide a measurement service.

The remote UE may send the third message to the ProSe UE-to-NW relay in a unicast manner, or may send the third message in a broadcast manner. The third message may carry an identifier of the ProSe UE-to-NW relay. Particularly, if the third message is sent in the broadcast manner, multiple ProSe UE-to-NW relays may be able to receive the third message, so that after a ProSe UE-to-NW relay receives the third message, if the identifier carried in the third message is not an identifier of the ProSe UE-to-NW relay, the ProSe UE-to-NW relay may make no response. Only a ProSe UE-to-NW relay whose identifier is the identifier carried in the third message makes a response. In this way, it can be ensured that the fourth message received by the remote UE is a message required by the remote UE.

In addition, in Example 5, the ProSe UE-to-NW relay broadcasts the fourth message, and in Example 6, the ProSe UE-to-NW relay may send the fourth message in a unicast manner or a multicast manner.

In Example 6, when having a requirement, remote UE may send a third message to a ProSe UE-to-NW relay. After receiving the third message, the ProSe UE-to-NW relay sends a fourth message to the remote UE. Therefore, a signal strength measurement requirement of the remote UE is met, a quantity of first messages sent by the ProSe UE-to-NW relay is reduced, and transmission resources are saved.

The following describes the device in the embodiments of the present invention with reference to the accompanying drawings.

Figure 13:
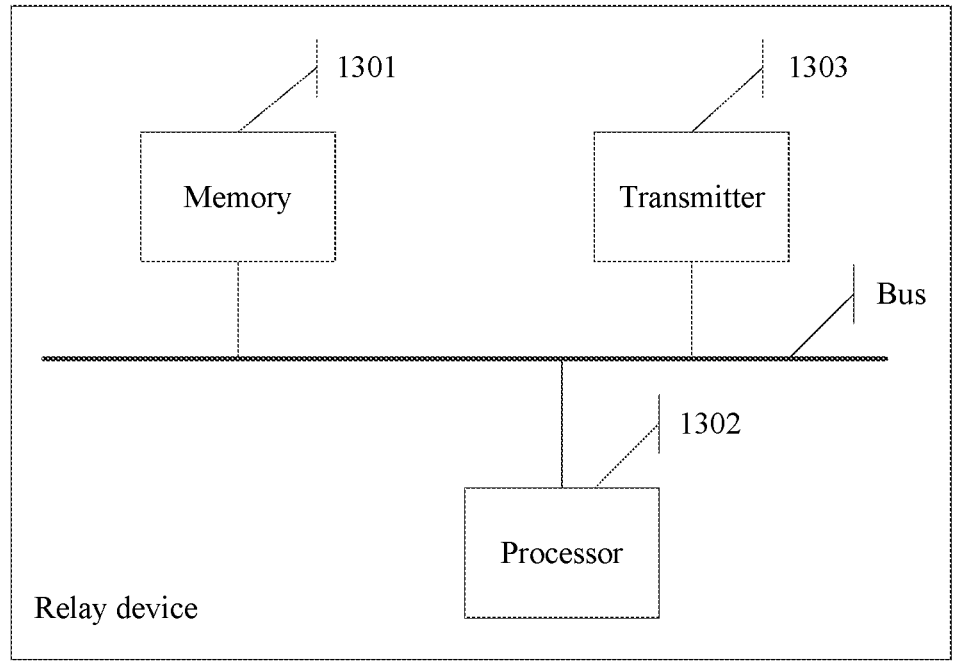
FIG. 13 is a first schematic structural diagram of a relay device according to an embodiment of the present invention.

Referring to FIG. 13, based on a same invention concept, an embodiment of the present invention provides a first relay device. The relay device may include a memory 1301, a processor 1302, and a transmitter 1303.

The processor 1302 may be specifically a central processing unit or an application-specific integrated circuit (Application Specific Integrated Circuit, ASIC), may be one or more integrated circuits configured to control program execution, may be a hardware circuit developed by using a field programmable gate array (Field Programmable Gate Array, FPGA), or may be a baseband chip.

There may be one or more memories 1301. The memory 1301 may include a read-only memory (Read Only Memory, ROM), a random access memory (Random Access Memory, RAM), and a magnetic disk memory.

The transmitter 1303 may belong to a radio frequency system, and may be configured to perform network communication with an external device. Specifically, the transmitter 1303 may communicate with the external device by using a network such as an Ethernet, a radio access network, or a wireless local area network.

The memories 1301 and the transmitter 1303 may be connected to the processor 1302 by using a bus (this is used as an example in FIG. 13), or may be separately connected to the processor 1302 by using a dedicated connection cable.

Code corresponding to the methods described above is built into a chip by designing programming for the processor 1302, so that when operating, the chip can execute the methods shown in FIG. 2 and FIG. 3. How to design programming for the processor 1302 is a technology well known to a person skilled in the art, and is not described herein.

The relay device may be configured to execute the methods shown in FIG. 2 and FIG. 3. For example, the relay device may be the first relay device described above. Therefore, for functions and the like implemented by the units in the relay device, refer to description of the foregoing methods. Details are not described again.

Figure 14:
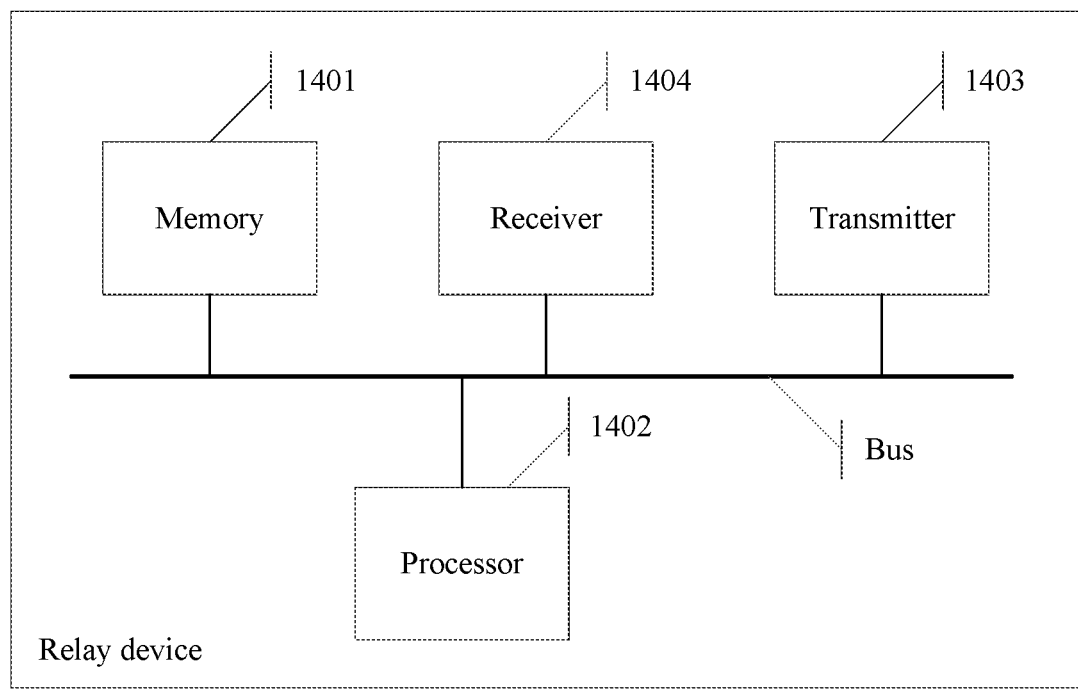
FIG. 14 is a second schematic structural diagram of a relay device according to an embodiment of the present invention.

Referring to FIG. 14, based on a same invention concept, an embodiment of the present invention provides a second relay device. The relay device may include a memory 1401, a processor 1402, a transmitter 1403, and a receiver 1404.

The processor 1402 may be specifically a central processing unit or an ASIC, may be one or more integrated circuits configured to control program execution, may be a hardware circuit developed by using an FPGA, or may be a baseband chip.

There may be one or more memories 1401. The memory 1401 may include a ROM, a RAM, and a magnetic disk memory.

The receiver 1404 and the transmitter 1403 may belong to a radio frequency system, and may be configured to perform network communication with an external device. Specifically, the receiver 1404 and the transmitter 1403 may communicate with the external device by using a network such as an Ethernet, a radio access network, or a wireless local area network. The receiver 1404 and the transmitter 1403 may be a same entity module, for example, may be a transceiver; or may be different entity modules.

The memories 1401, the receiver 1404, and the transmitter 1403 may be connected to the processor 1402 by using a bus (this is used as an example in FIG. 14), or may be separately connected to the processor 1402 by using a dedicated connection cable.

Code corresponding to the methods described above is built into a chip by designing programming for the processor 1402, so that when operating, the chip can execute the methods shown in FIG. 4 and FIG. 5. How to design programming for the processor 1402 is a technology well known to a person skilled in the art, and is not described herein.

The relay device may be configured to execute the methods shown in FIG. 4 and FIG. 5. For example, the relay device may be the first relay device described above. Therefore, for functions and the like implemented by the units in the relay device, refer to description of the foregoing methods. Details are not described again.

Figure 15:
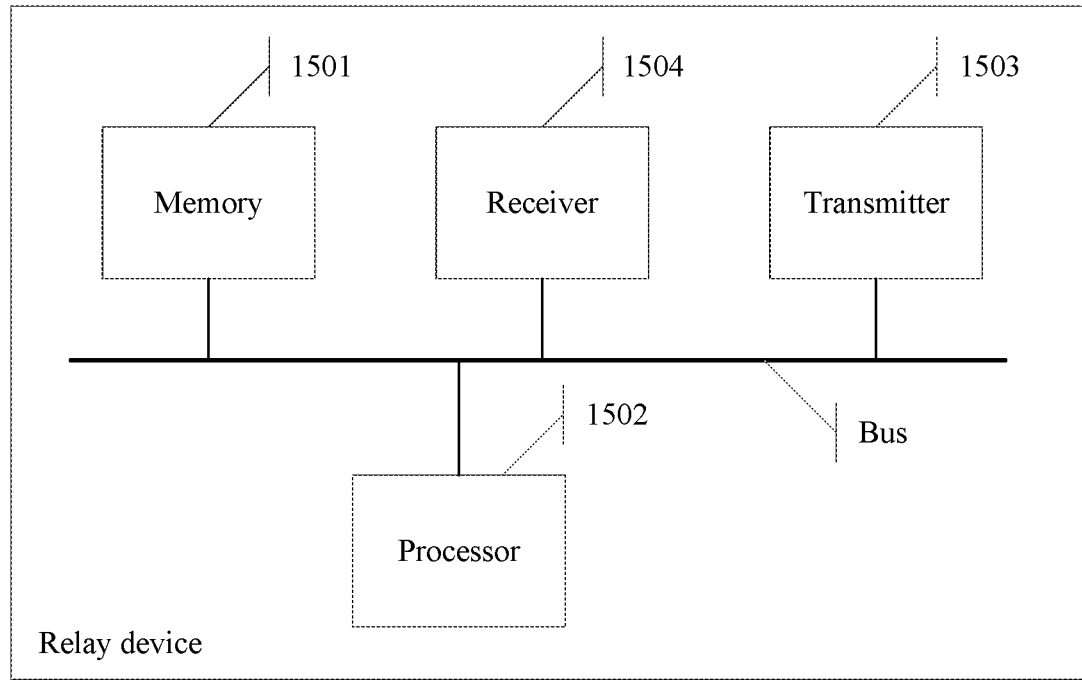
FIG. 15 is a third schematic structural diagram of a relay device according to an embodiment of the present invention.

Referring to FIG. 15, based on a same invention concept, an embodiment of the present invention provides a third relay device. The relay device may include a memory 1501, a processor 1502, a transmitter 1503, and a receiver 1504.

The processor 1502 may be specifically a central processing unit or an ASIC, may be one or more integrated circuits configured to control program execution, may be a hardware circuit developed by using an FPGA, or may be a baseband chip.

There may be one or more memories 1501. The memory 1501 may include a ROM, a RAM, and a magnetic disk memory.

The receiver 1504 and the transmitter 1503 may belong to a radio frequency system, and may be configured to perform network communication with an external device. Specifically, the receiver 1504 and the transmitter 1503 may communicate with the external device by using a network such as an Ethernet, a radio access network, or a wireless local area network. The receiver 1504 and the transmitter 1503 may be a same entity module, for example, may be a transceiver; or may be different entity modules.

The memories 1501, the receiver 1504, and the transmitter 1503 may be connected to the processor 1502 by using a bus (this is used as an example in FIG. 15), or may be separately connected to the processor 1502 by using a dedicated connection cable.

Code corresponding to the methods described above is built into a chip by designing programming for the processor 1502, so that when operating, the chip can execute the methods shown in FIG. 6 and FIG. 7. How to design programming for the processor 1502 is a technology well known to a person skilled in the art, and is not described herein.

The relay device may be configured to execute the methods shown in FIG. 6 and FIG. 7. For example, the relay device may be the first relay device described above. Therefore, for functions and the like implemented by the units in the relay device, refer to description of the foregoing methods. Details are not described again.

Figure 16:
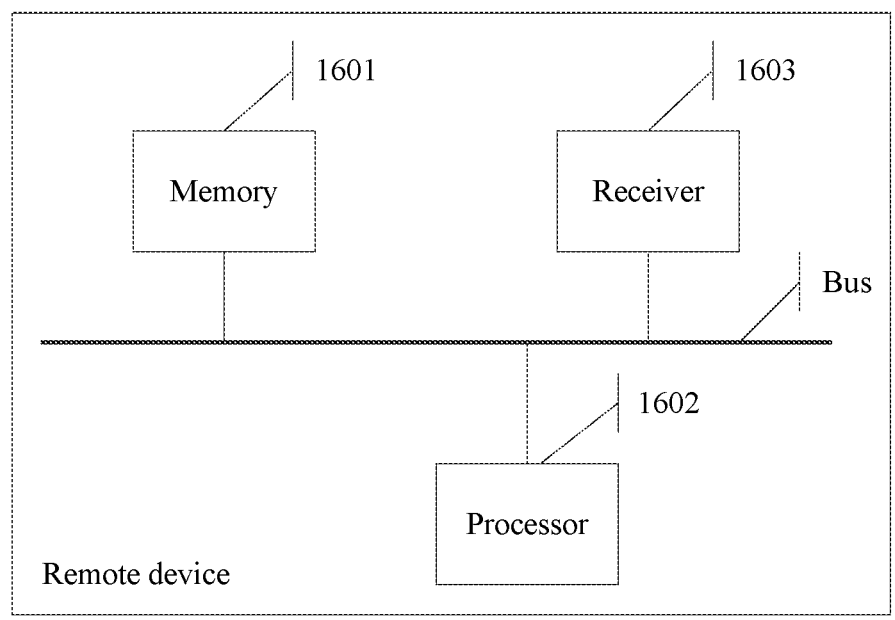
FIG. 16 is a first schematic structural diagram of a remote device according to an embodiment of the present invention.

Referring to FIG. 16, based on a same invention concept, an embodiment of the present invention provides a first remote device. The remote device may include a memory 1601, a processor 1602, and a receiver 1603.

The processor 1602 may be specifically a central processing unit or an ASIC, may be one or more integrated circuits configured to control program execution, may be a hardware circuit developed by using an FPGA, or may be a baseband chip.

There may be one or more memories 1601. The memory 1601 may include a ROM, a RAM, and a magnetic disk memory.

The receiver 1603 may belong to a radio frequency system, and may be configured to perform network communication with an external device. Specifically, the receiver 1603 may communicate with the external device by using a network such as an Ethernet, a radio access network, or a wireless local area network.

The memories 1601 and the receiver 1603 may be connected to the processor 1602 by using a bus (this is used as an example in FIG. 16), or may be separately connected to the processor 1602 by using a dedicated connection cable.

Code corresponding to the methods described above is built into a chip by designing programming for the processor 1602, so that when operating, the chip can execute the methods shown in FIG. 2 and FIG. 3. How to design programming for the processor 1602 is a technology well known to a person skilled in the art, and is not described herein.

The remote device may be configured to execute the methods shown in FIG. 2 and FIG. 3. For example, the remote device may be the first remote device described above. Therefore, for functions and the like implemented by the units in the remote device, refer to description of the foregoing methods. Details are not described again.

Figure 17:
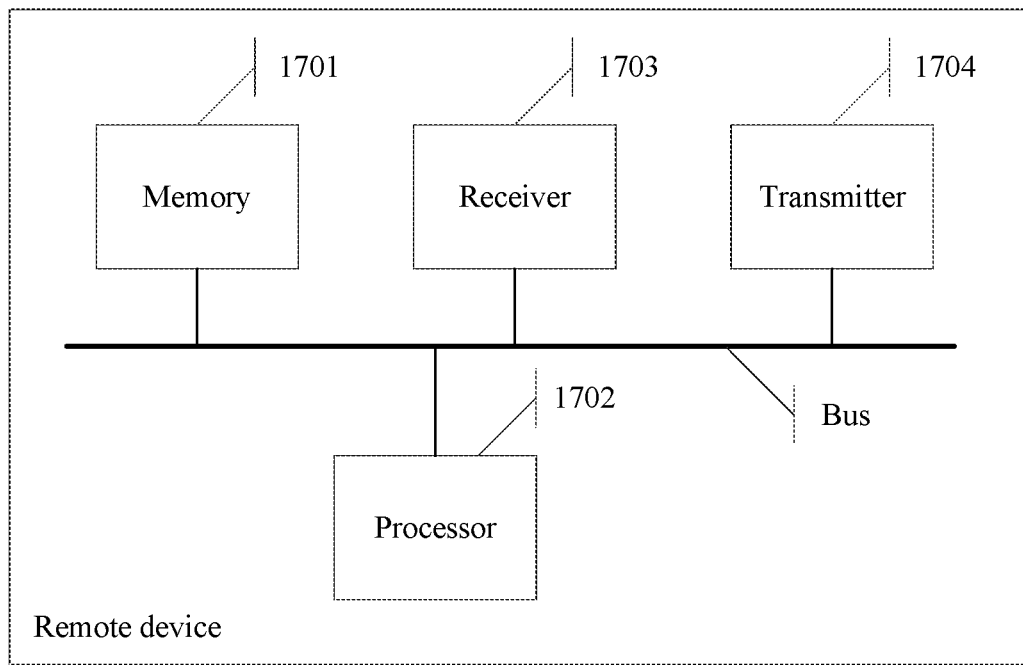
FIG. 17 is a second schematic structural diagram of a remote device according to an embodiment of the present invention.

Referring to FIG. 17, based on a same invention concept, an embodiment of the present invention provides a second remote device. The remote device may include a memory 1701, a processor 1702, a receiver 1703, and a transmitter 1704.

The processor 1702 may be specifically a central processing unit or an ASIC, may be one or more integrated circuits configured to control program execution, may be a hardware circuit developed by using an FPGA, or may be a baseband chip.

There may be one or more memories 1701. The memory 1701 may include a ROM, a RAM, and a magnetic disk memory.

The receiver 1703 and the transmitter 1704 may belong to a radio frequency system, and may be configured to perform network communication with an external device. Specifically, the receiver 1703 and the transmitter 1704 may communicate with the external device by using a network such as an Ethernet, a radio access network, or a wireless local area network. The receiver 1703 and the transmitter 1704 may be a same entity module, for example, may be a transceiver; or may be different entity modules.

The memories 1701, the receiver 1703, and the transmitter 1704 may be connected to the processor 1702 by using a bus (this is used as an example in FIG. 17), or may be separately connected to the processor 1702 by using a dedicated connection cable.

Code corresponding to the methods described above is built into a chip by designing programming for the processor 1702, so that when operating, the chip can execute the methods shown in FIG. 4 and FIG. 5. How to design programming for the processor 1702 is a technology well known to a person skilled in the art, and is not described herein.

The remote device may be configured to execute the methods shown in FIG. 4 and FIG. 5. For example, the remote device may be the first remote device described above. Therefore, for functions and the like implemented by the units in the remote device, refer to description of the foregoing methods. Details are not described again.

Figure 18:
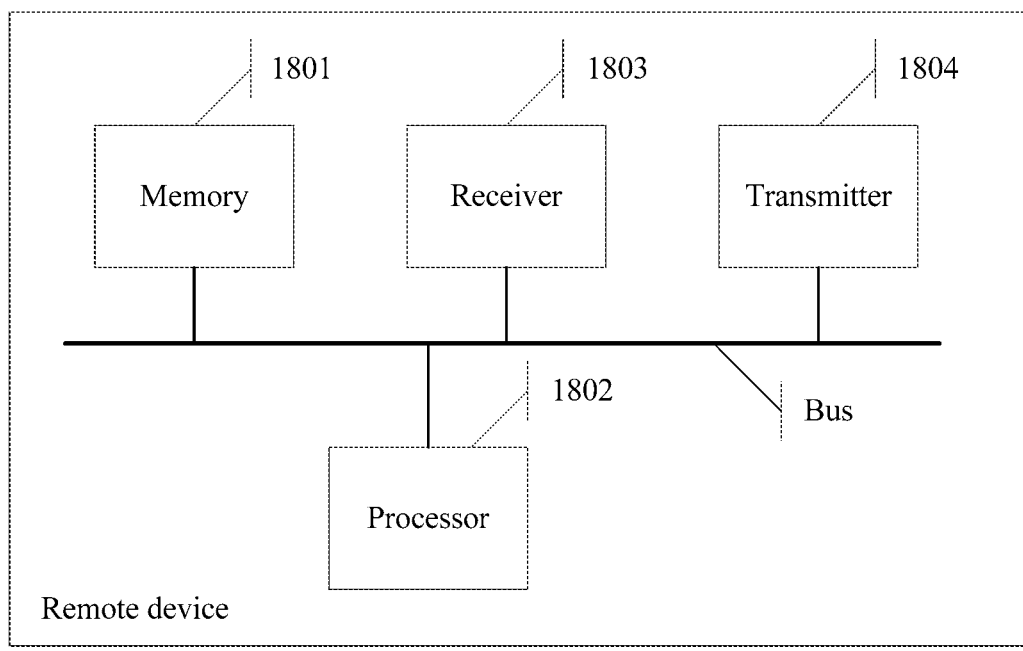
FIG. 18 is a third schematic structural diagram of a remote device according to an embodiment of the present invention.

Referring to FIG. 18, based on a same invention concept, an embodiment of the present invention provides a third remote device. The remote device may include a memory 1801, a processor 1802, a receiver 1803, and a transmitter 1804.

The processor 1802 may be specifically a central processing unit or an ASIC, may be one or more integrated circuits configured to control program execution, may be a hardware circuit developed by using an FPGA, or may be a baseband chip.

There may be one or more memories 1801. The memory 1801 may include a ROM, a RAM, and a magnetic disk memory.

The receiver 1803 and the transmitter 1804 may belong to a radio frequency system, and may be configured to perform network communication with an external device. Specifically, the receiver 1803 and the transmitter 1804 may communicate with the external device by using a network such as an Ethernet, a radio access network, or a wireless local area network.

The memories 1801, the receiver 1803, and the transmitter 1804 may be connected to the processor 1802 by using a bus (this is used as an example in FIG. 18), or may be separately connected to the processor 1802 by using a dedicated connection cable.

Code corresponding to the methods described above is built into a chip by designing programming for the processor 1802, so that when operating, the chip can execute the methods shown in FIG. 6 and FIG. 7. How to design programming for the processor 1802 is a technology well known to a person skilled in the art, and is not described herein.

The remote device may be configured to execute the methods shown in FIG. 6 and FIG. 7. For example, the remote device may be the first remote device described above. Therefore, for functions and the like implemented by the units in the remote device, refer to description of the foregoing methods. Details are not described again.

Figure 19:
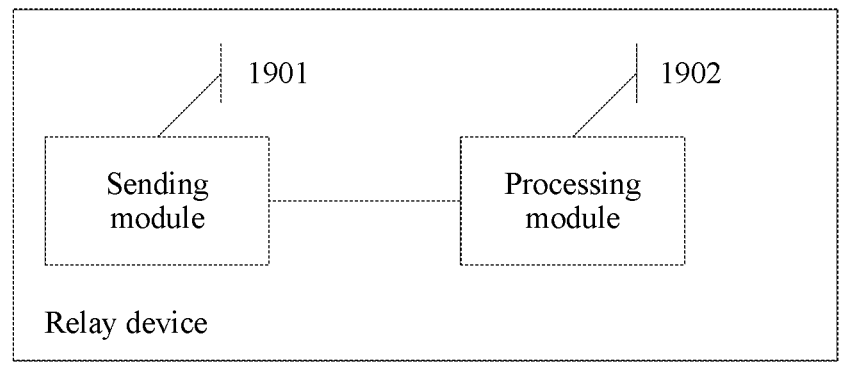
FIG. 19 is a first structural block diagram of a relay device according to an embodiment of the present invention.

Referring to FIG. 19, based on a same invention concept, an embodiment of the present invention provides a fourth relay device. The relay device may include a sending module 1901 and a processing module 1902.

In actual application, an entity device corresponding to the processing module 1902 may be the processor 1302 in FIG. 13, and an entity device corresponding to the sending module 1901 may be the transmitter 1303 in FIG. 13.

The relay device may be configured to execute the methods shown in FIG. 2 and FIG. 3. For example, the relay device may be the first relay device. Therefore, for functions and the like implemented by the units in the relay device, refer to description of the foregoing methods. Details are not described again.

Figure 20:
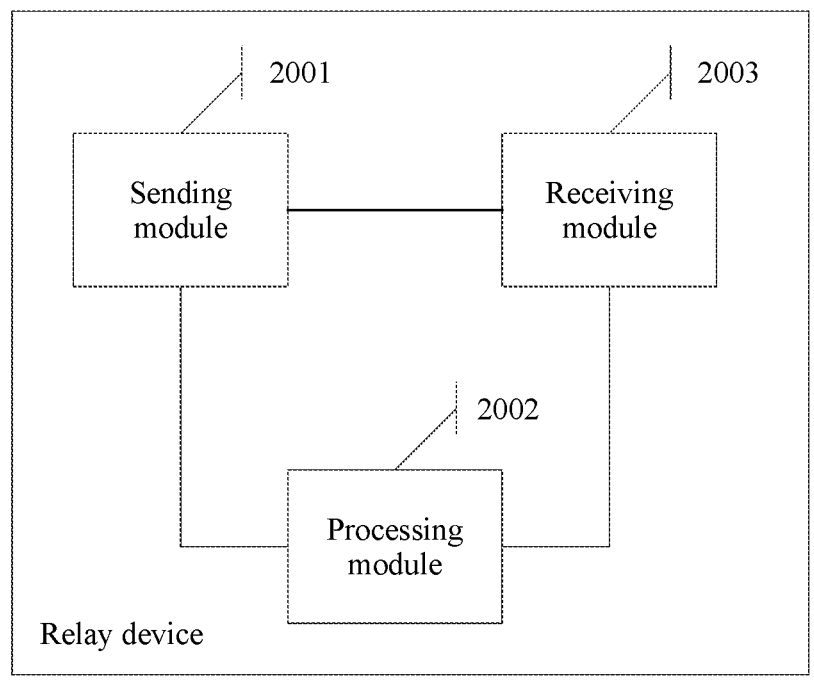
FIG. 20 is a second structural block diagram of a relay device according to an embodiment of the present invention.

Referring to FIG. 20, based on a same invention concept, an embodiment of the present invention provides a fifth relay device. The relay device may include a sending module 2001, a processing module 2002, and a receiving module 2003.

In actual application, an entity device corresponding to the processing module 2002 may be the processor 1402 in FIG. 14, an entity device corresponding to the sending module 2001 may be the transmitter 1403 in FIG. 14, and an entity device corresponding to the receiving module 2003 may be the receiver 1404 in FIG. 14.

The relay device may be configured to execute the methods shown in FIG. 4 and FIG. 5. For example, the relay device may be the first relay device. Therefore, for functions and the like implemented by the units in the relay device, refer to description of the foregoing methods. Details are not described again.

Figure 21:
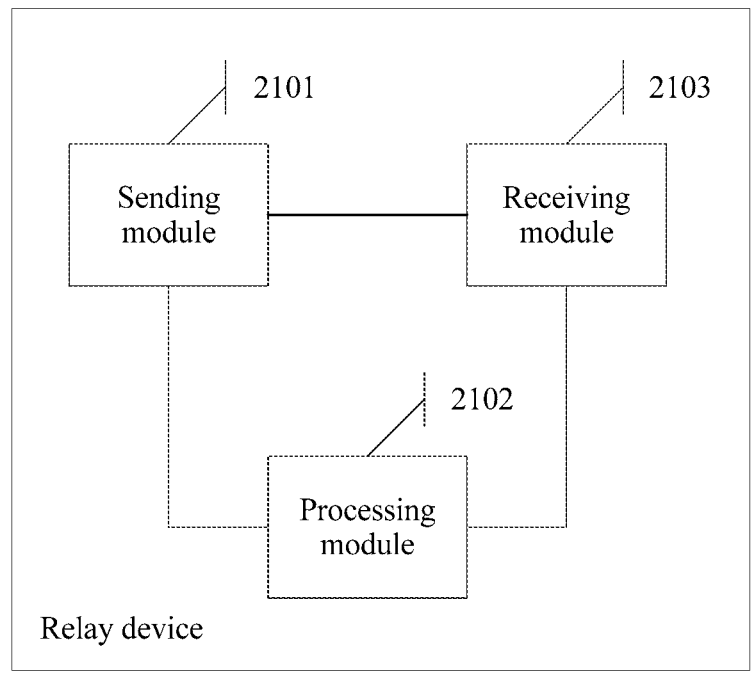
FIG. 21 is a third structural block diagram of a relay device according to an embodiment of the present invention.

Referring to FIG. 21, based on a same invention concept, an embodiment of the present invention provides a sixth relay device. The relay device may include a sending module 2101, a processing module 2102, and a receiving module 2103.

In actual application, an entity device corresponding to the processing module 2102 may be the processor 1502 in FIG. 15, an entity device corresponding to the sending module 2101 may be the transmitter 1503 in FIG. 15, and an entity device corresponding to the receiving module 2103 may be the receiver 1504 in FIG. 15.

The relay device may be configured to execute the methods shown in FIG. 6 and FIG. 7. For example, the relay device may be the first relay device. Therefore, for functions and the like implemented by the units in the relay device, refer to description of the foregoing methods. Details are not described again.

Figure 22:
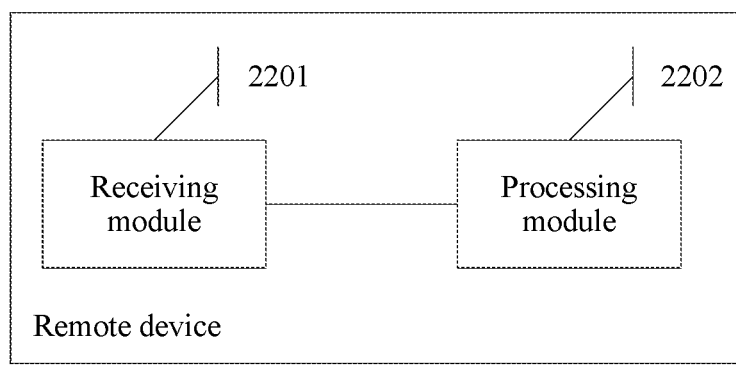
FIG. 22 is a first structural block diagram of a remote device according to an embodiment of the present invention.

Referring to FIG. 22, based on a same invention concept, an embodiment of the present invention provides a fourth remote device. The remote device may include a receiving module 2201 and a processing module 2202.

In actual application, an entity device corresponding to the processing module 2202 may be the processor 1602 in FIG. 16, and an entity device corresponding to the receiving module 2201 may be the receiver 1603 in FIG. 16.

The remote device may be configured to execute the methods shown in FIG. 2 and FIG. 3. For example, the remote device may be the first remote device. Therefore, for functions and the like implemented by the units in the remote device, refer to description of the foregoing methods. Details are not described again.

Figure 23:
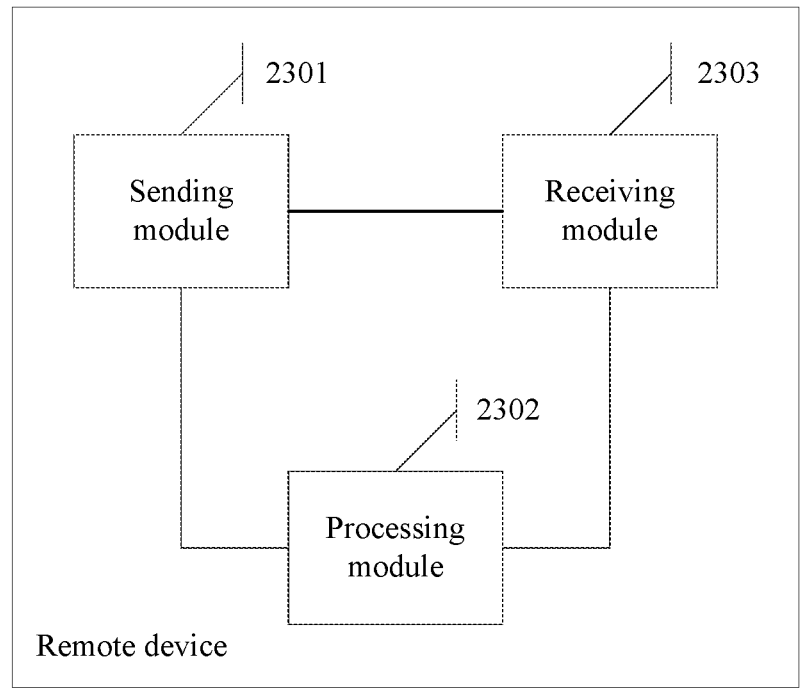
FIG. 23 is a second structural block diagram of a remote device according to an embodiment of the present invention.

Referring to FIG. 23, based on a same invention concept, an embodiment of the present invention provides a fifth remote device. The remote device may include a sending module 2301, a processing module 2302, and a receiving module 2303.

In actual application, an entity device corresponding to the processing module 2302 may be the processor 1702 in FIG. 17, an entity device corresponding to the sending module 2301 may be the transmitter 1704 in FIG. 17, and an entity device corresponding to the receiving module 2303 may be the receiver 1703 in FIG. 17.

The remote device may be configured to execute the methods shown in FIG. 4 and FIG. 5. For example, the remote device may be the first remote device. Therefore, for functions and the like implemented by the units in the remote device, refer to description of the foregoing methods. Details are not described again.

Figure 24:
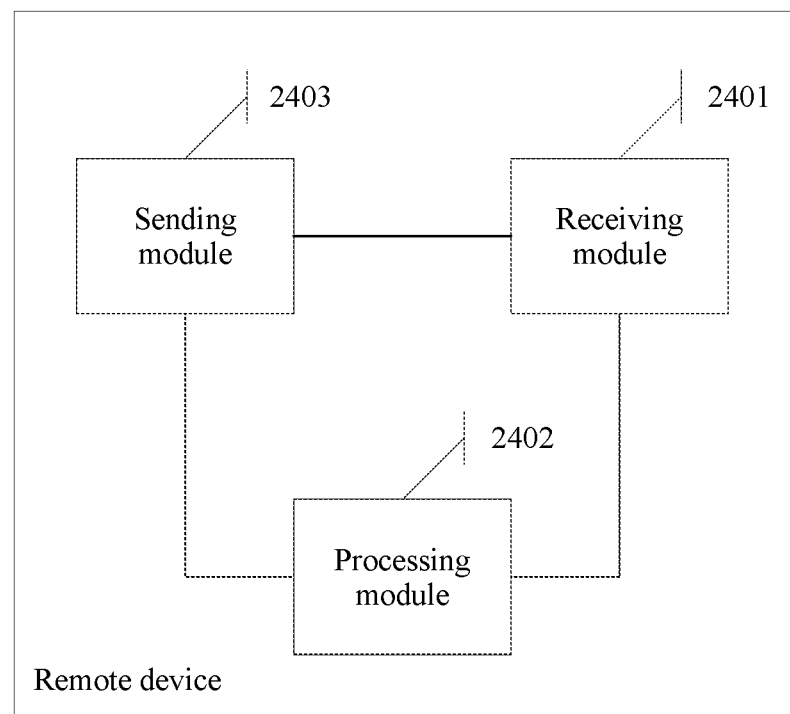
FIG. 24 is a third structural block diagram of a remote device according to an embodiment of the present invention.

Referring to FIG. 24, based on a same invention concept, an embodiment of the present invention provides a sixth remote device. The remote device may include a receiving module 2401, a processing module 2402, and a sending module 2403.

In actual application, an entity device corresponding to the processing module 2402 may be the processor 1802 in FIG. 18, an entity device corresponding to the receiving module 2401 may be the receiver 1803 in FIG. 18, and an entity device corresponding to the sending module 2403 may be the transmitter 1804 in FIG. 18.

The remote device may be configured to execute the methods shown in FIG. 6 and FIG. 7. For example, the remote device may be the first remote device. Therefore, for functions and the like implemented by the units in the remote device, refer to description of the foregoing methods. Details are not described again.

Based on a same invention concept, an embodiment of the present invention further provides three communications systems. The three communications systems are separately described as follows:

In terms of a first communications system, the first communications system may include a relay device and a remote device. One or more relay devices may be included, and one or more remote devices may also be included.

The relay device in the first communications system may be the relay device in FIG. 13 or FIG. 19, that is, may complete the steps in FIG. 2 and FIG. 3. The remote device in the first communications system may be the remote device in FIG. 16 or FIG. 22, that is, may complete the steps in FIG. 2 and FIG. 3.

In terms of a second communications system, the second communications system may include a relay device and a remote device. One or more relay devices may be included, and one or more remote devices may also be included.

The relay device in the second communications system may be the relay device in FIG. 14 or FIG. 20, that is, may complete the steps in FIG. 4 and FIG. 5. The remote device in the second communications system may be the remote device in FIG. 17 or FIG. 23, that is, may complete the steps in FIG. 4 and FIG. 5.

In terms of a third communications system:

the third communications system may include a relay device and a remote device. One or more relay devices may be included, and one or more remote devices may also be included.

The relay device in the third communications system may be the relay device in FIG. 15 or FIG. 21, that is, may complete the steps in FIG. 6 and FIG. 7. The remote device in the third communications system may be the remote device in FIG. 18 or FIG. 24, that is, may complete the steps in FIG. 6 and FIG. 7.

In the embodiments of the present invention, a relay device further sends a second message after establishing a connection to a remote device, so that the remote device may measure signal strength of a link between the remote device and the relay device after receiving the second message. That is, after the remote device establishes a connection to the relay device, the relay device may further continue to send the second message, so that the remote device may continue to measure the signal strength between the remote device and the relay device, so as to use the signal strength as a basis for determining whether a relay device needs to be reselected. For example, if the remote device determines, by means of measurement, that the signal strength of the link between the remote device and the relay device is relatively weak, the remote device may be disconnected from the relay device, and apply for establishing a connection to another relay device, so as to ensure that the remote device can obtain good service quality, improve utilization of a link with relatively high quality, and improve system reliability.

It may be clearly understood by a person skilled in the art that, for the purpose of convenient and brief description, division of the foregoing function modules is taken as an example for illustration. In actual application, the foregoing functions can be allocated to different function modules for implementation according to a requirement, that is, an inner structure of an apparatus is divided into different function modules to implement all or some of the functions described above. For a detailed working process of the described system, apparatus, and unit, refer to a corresponding process in the foregoing method embodiments, and details are not described herein.

In the several embodiments provided in the present invention, it should be understood that the disclosed device and method may be implemented in other manners. For example, the described apparatus embodiments are merely examples. For example, the module or unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on multiple network units. Some or all of the units may be selected according to actual needs to achieve the objectives of the solutions of the embodiments.

In addition, function units in the embodiments of the present invention may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) or a processor (processor) to perform all or some of the steps of the methods described in the embodiments of this application. The foregoing storage medium includes any medium that can store program code, such as a USB flash drive, a removable hard disk, a ROM, a RAM, a magnetic disk, or an optical disc.

The foregoing embodiments are merely used to describe the technical solutions of the present invention in detail. The foregoing embodiments are merely intended to help understand the method and core idea of the present invention, and shall not be construed as a limitation on the present invention. Any variation or replacement readily figured out by a person skilled in the art within the technical scope disclosed in the present invention shall fall within the protection scope of the present invention.

What is claimed is:

1. A signal strength measurement method, comprising:
broadcasting, by a first relay device, a first message, wherein the first message is used by a first remote device to discover the first relay device;
establishing, by the first relay device, a connection to the first remote device;
sending, by the first relay device, a second message, wherein the second message is used by the first remote device to measure signal strength of a link between the first remote device and the first relay device, wherein the first message is different from the second message;

determining, by the first relay device, that the first relay device reaches an upper access limit; and in response to determining that the first relay device reaches the upper access limit, performing the following operations:

stopping, by the first relay device, sending the first message while continuing to send the second message.

2. The method according to claim 1, wherein the second message carries an identifier of the first relay device, and the identifier of the first relay device comprises a first codeword that identifies the first relay device.

3. The method according to claim 1, wherein the sending, by the first relay device, the second message comprises:

broadcasting, by the first relay device, the second message; or sending, by the first relay device, the second message to the first remote device in a unicast or multicast manner.

4. A signal strength measurement method, comprising:

receiving, by a relay device, a first message sent by a first remote device, wherein the first message requests the relay device to provide a relay service;

sending, by the relay device, a second message, wherein the second message is used by the first remote device to discover the relay device;

establishing, by the relay device, a connection to the first remote device;

receiving, by the relay device, a third message sent by the first remote device, wherein the third message requests the relay device to provide a measurement service;

sending a fourth message to the first remote device, wherein the fourth message is used by the first remote device to measure signal strength of a link between the first remote device and the relay device, wherein the first message is different from the third message;

determining, by the relay device, that the relay device reaches an upper access limit; and in response to determining that the relay device reaches the upper access limit, performing the following operations:

stopping, by the relay device, sending the second message while continuing to send the fourth message.

5. The method according to claim 4, wherein the fourth message carries an identifier of the relay device, and the identifier of the relay device comprises a first codeword that identifies the relay device.

6. A signal strength measurement method, comprising:

sending, by a first remote device, a first message to a relay device, wherein the first message requests the relay device to provide a relay service;

receiving, by the first remote device, a second message sent by the relay device, wherein the second message is used by the first remote device to discover the relay device;

establishing, by the first remote device, a connection to the relay device;

sending, by the first remote device, a third message to the relay device, wherein the third message requests the relay device to provide a measurement service;

receiving, by the first remote device, a fourth message, wherein the fourth message is used by the first remote device to measure signal strength of a link between the first remote device and the relay device, the second message is different from the fourth message, the fourth message carries an identifier of the relay device, and the second message is stopped after the relay device reaches an upper access limit.

\* \* \* \* \*